US012639210B2

(12) United States Patent
Sasaki et al.

(10) Patent No.: US 12,639,210 B2
(45) Date of Patent: May 26, 2026

(54) MEMORY SYSTEM MANAGING MULTIPLE LOGICAL ADDRESS SPACES

(71) Applicant: Kioxia Corporation, Tokyo (JP)

(72) Inventors: Yuki Sasaki, Kamakura (JP); Aurelien Nam Phong Tran, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/788,545

(22) Filed: Jul. 30, 2024

(65) Prior Publication Data

US 2025/0094337 A1 Mar. 20, 2025

(30) Foreign Application Priority Data

Sep. 14, 2023 (JP) ................................. 2023-149123

(51) Int. Cl.
*G06F 12/02* (2006.01)
*G06F 3/06* (2006.01)
(52) U.S. Cl.
CPC .......... *G06F 12/0246* (2013.01); *G06F 3/061* (2013.01); *G06F 3/0659* (2013.01); *G06F 3/0679* (2013.01); *G06F 2212/7207* (2013.01)
(58) Field of Classification Search
CPC ...... G06F 3/061; G06F 3/0659; G06F 3/0679; G06F 2212/1008; G06F 2212/1041; G06F 2212/7201; G06F 2212/7204; G06F 2212/7208
See application file for complete search history.

(56) References Cited

U.S. PATENT DOCUMENTS

| | | | |
|---|---|---|---|
| 2019/0042142 A1* | 2/2019 | Casmira ................ | G06F 3/0659 |
| 2019/0303309 A1* | 10/2019 | Sahoo ................. | H04L 47/6215 |
| 2019/0332276 A1 | 10/2019 | Gupta et al. | |
| 2020/0089537 A1 | 3/2020 | Bahirat et al. | |
| 2020/0104056 A1* | 4/2020 | Benisty ................ | G06F 3/0688 |
| 2022/0027092 A1 | 1/2022 | Katagiri | |
| 2022/0326890 A1 | 10/2022 | Jo et al. | |
| 2024/0427523 A1* | 12/2024 | Gururaj ................ | G06F 3/0607 |

FOREIGN PATENT DOCUMENTS

JP 2022-21026 A 2/2022

OTHER PUBLICATIONS

Watanabe et al., U.S. Appl. No. 18/594,070, filed Mar. 4, 2024.

* cited by examiner

*Primary Examiner* — Kalpit Parikh
(74) *Attorney, Agent, or Firm* — Oblon, McClelland, Maier & Neustadt, L.L.P.

(57) ABSTRACT

According to one embodiment, a controller of a memory system provides a host with logical address spaces. A plurality of queues of the host include one or more queues allocated to each of the logical address spaces. The controller calculates first use amounts of a nonvolatile memory corresponding to the logical address spaces, respectively, selects a queue from which a command is to be fetched among the plurality of queues, based on the first use amounts, fetches a command from the queue, calculates a predicted use amount of the nonvolatile memory in accordance with the command, and updates a second use amount corresponding to a first logical address space to which the first queue is allocated among the first use amounts by using the predicted use amount.

19 Claims, 17 Drawing Sheets

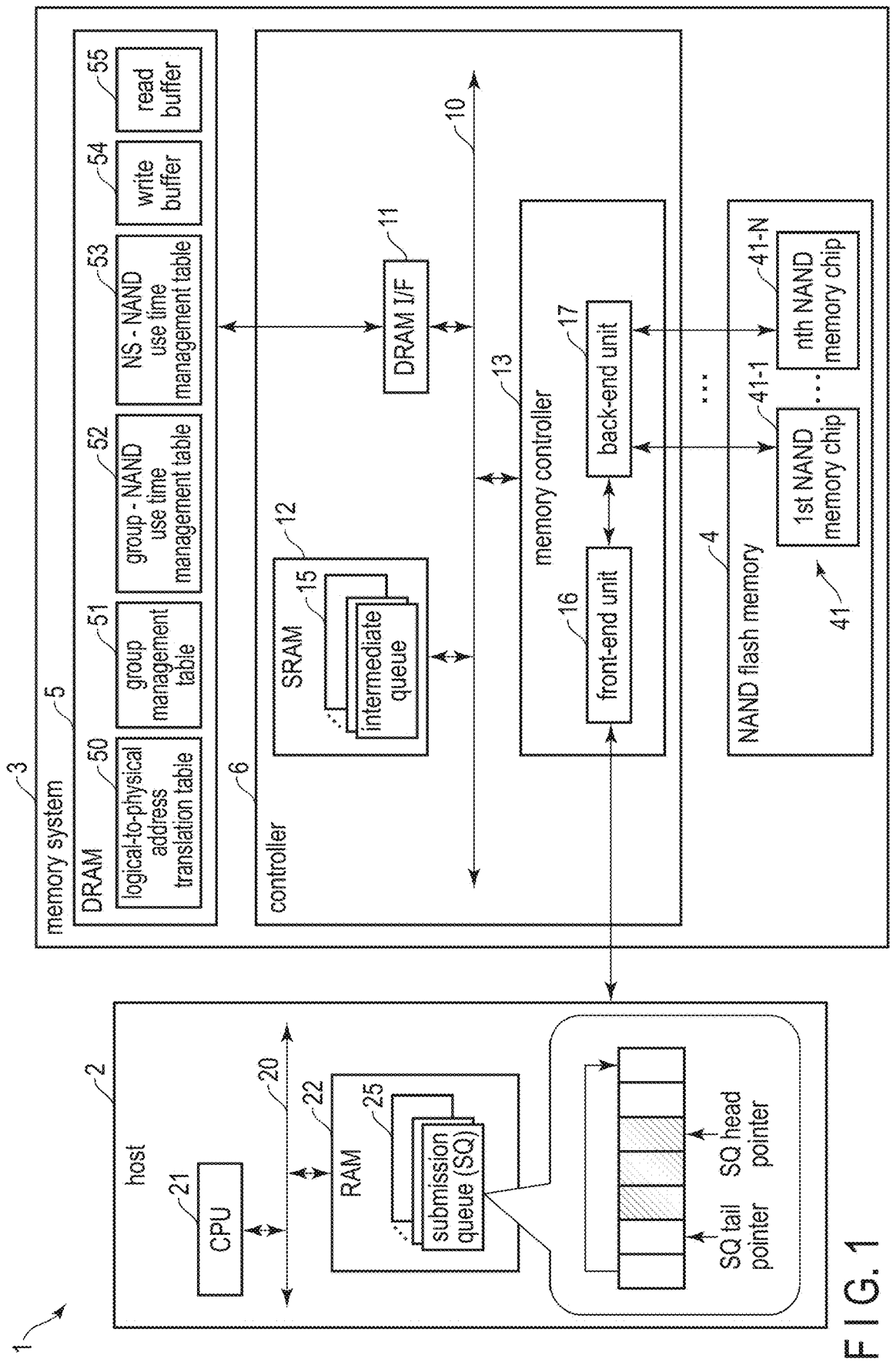
F I G. 1

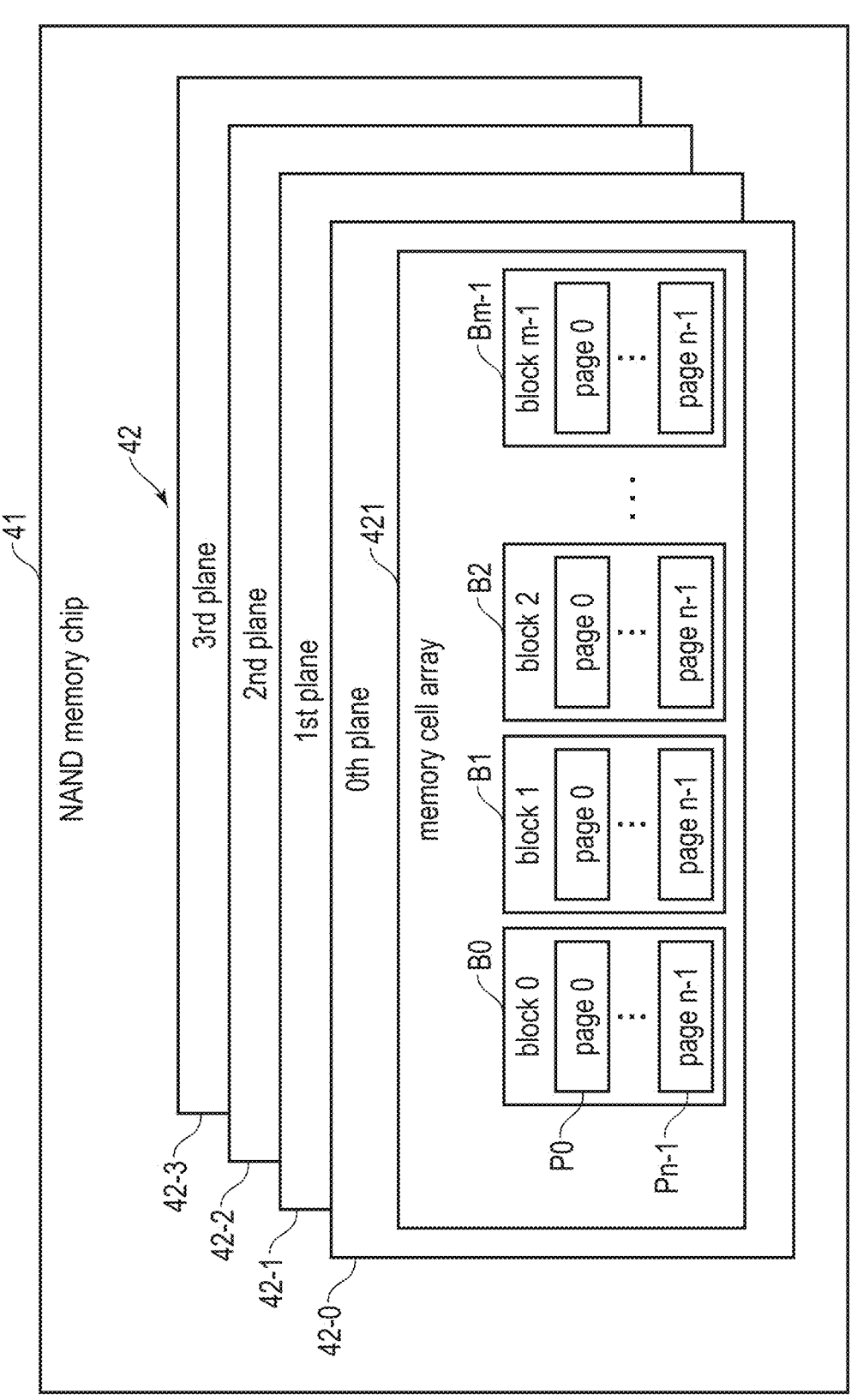
F I G. 2

| group | namespace (NS) | I/O type | submission queue (SQ) | weight W | priority P |
|---|---|---|---|---|---|
| 10 | 1 | write | 0, 1, 2, 3 | W10 | P10 |
| 11 | 1 | read | 4, 5, 6, 7 | W11 | P11 |
| 12 | 1 | N/A | N/A | N/A | N/A |
| 13 | 1 | N/A | N/A | N/A | N/A |
| 20 | 2 | write | 8, 9, 10, 11 | W20 | P20 |
| 21 | 2 | read | 12, 13 | W21 | P21 |
| 22 | 2 | read | 14, 15 | W22 | P22 |
| 23 | 2 | N/A | N/A | N/A | N/A |
| ... | ... | ... | ... | ... | ... |

F I G. 3

| group | NAND use time VT |
|-------|-------------------|
| 10 | VT10 |
| 11 | VT11 |
| 12 | N/A |
| 13 | N/A |
| 20 | VT20 |
| 21 | VT21 |
| 22 | VT22 |
| 23 | N/A |
| . . . | . . . |

F I G. 4

| namespace (NS) | NAND use time NVT |
|----------------|--------------------|
| 1 | NVT1 (=VT10+VT11) |
| 2 | NVT2 (=VT20+VT21+VT22) |
| . . . | . . . |

F I G. 5

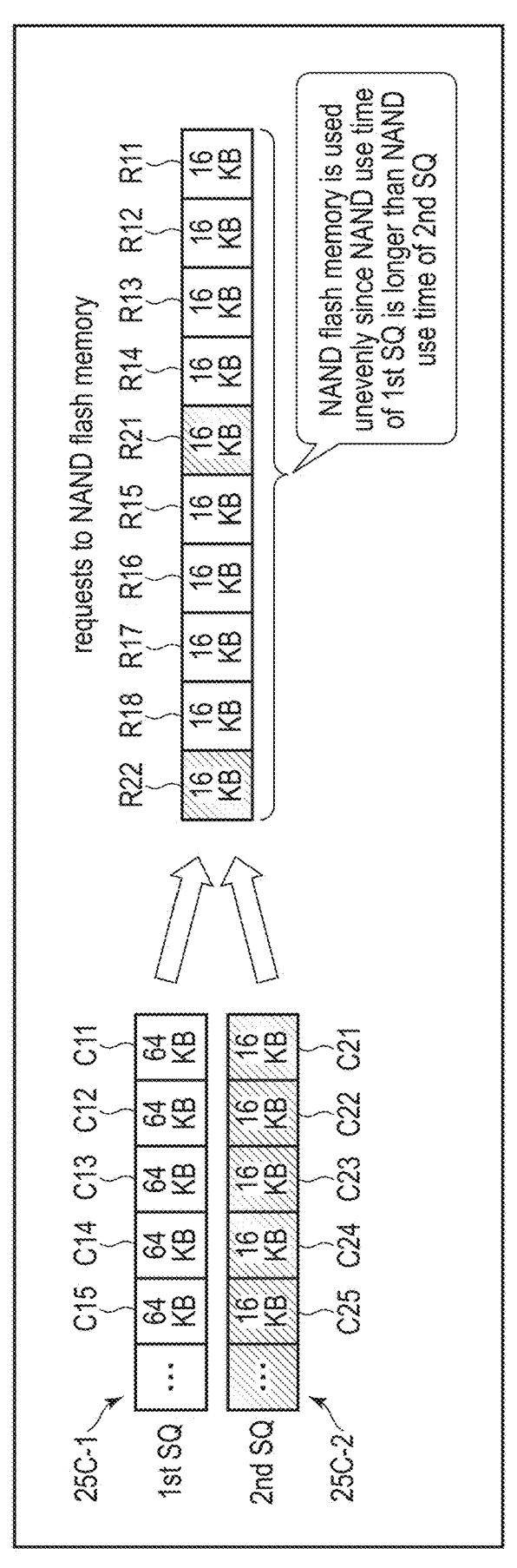
F I G. 6

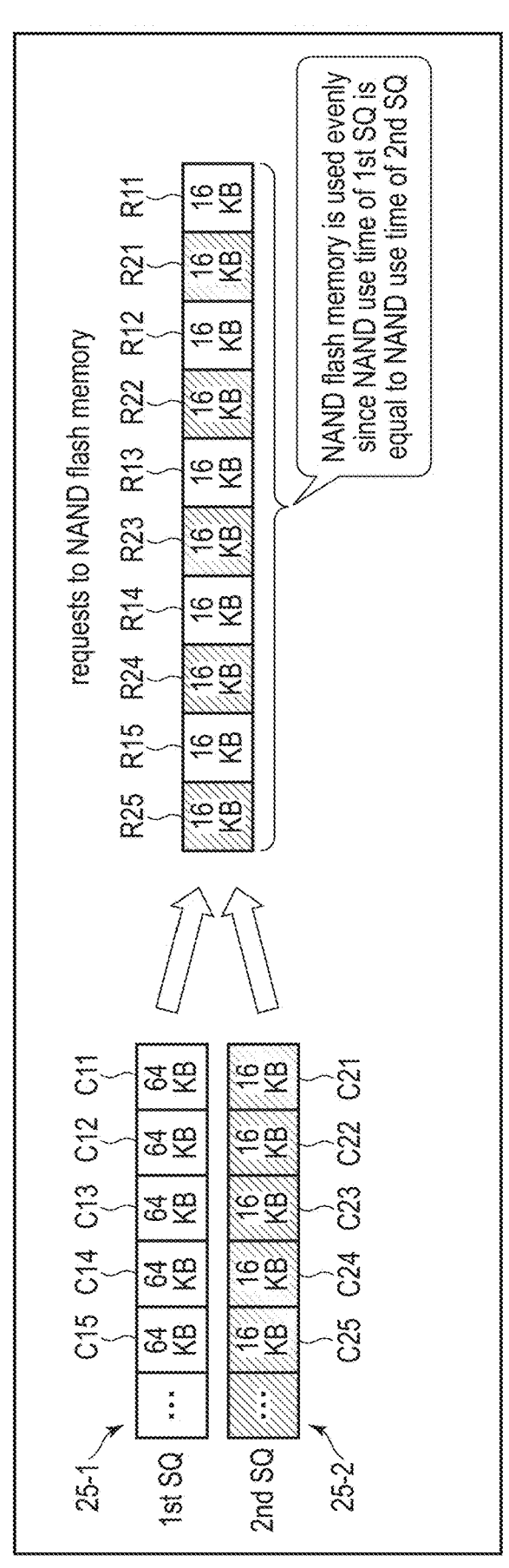
F I G. 7

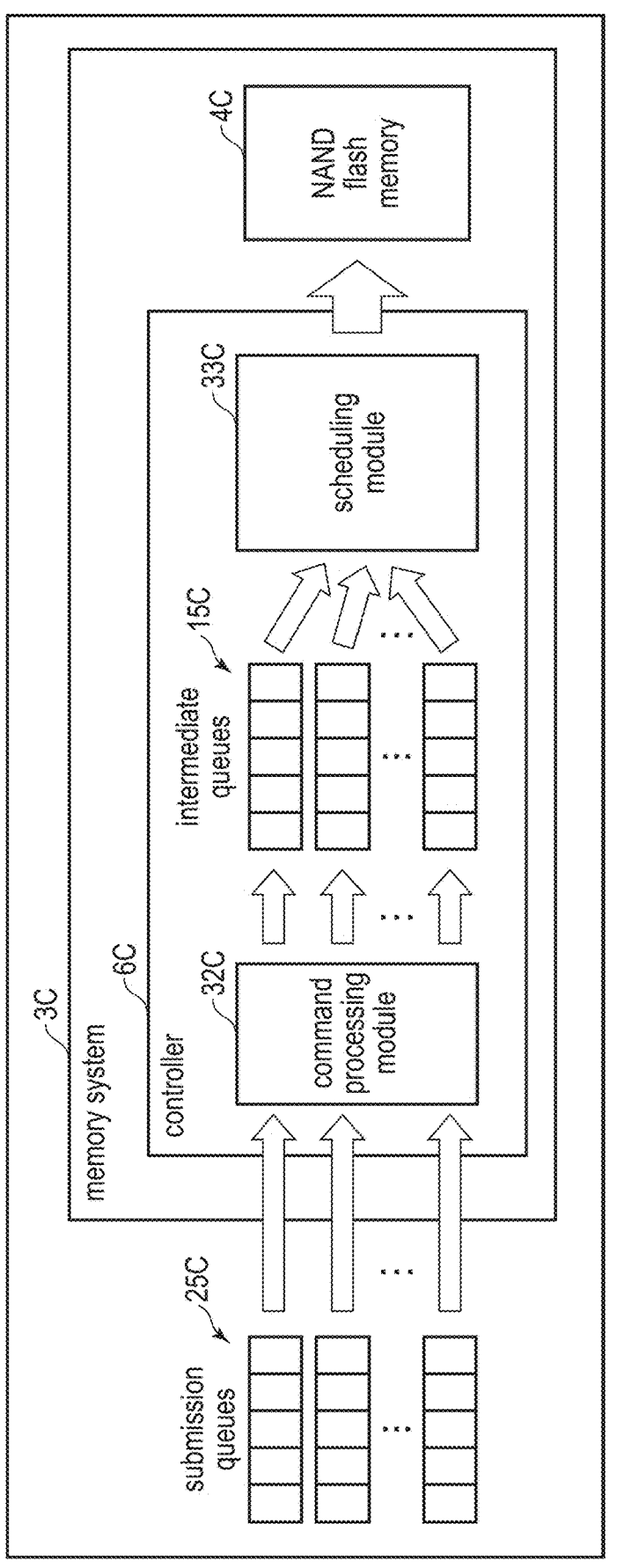
F I G . 8

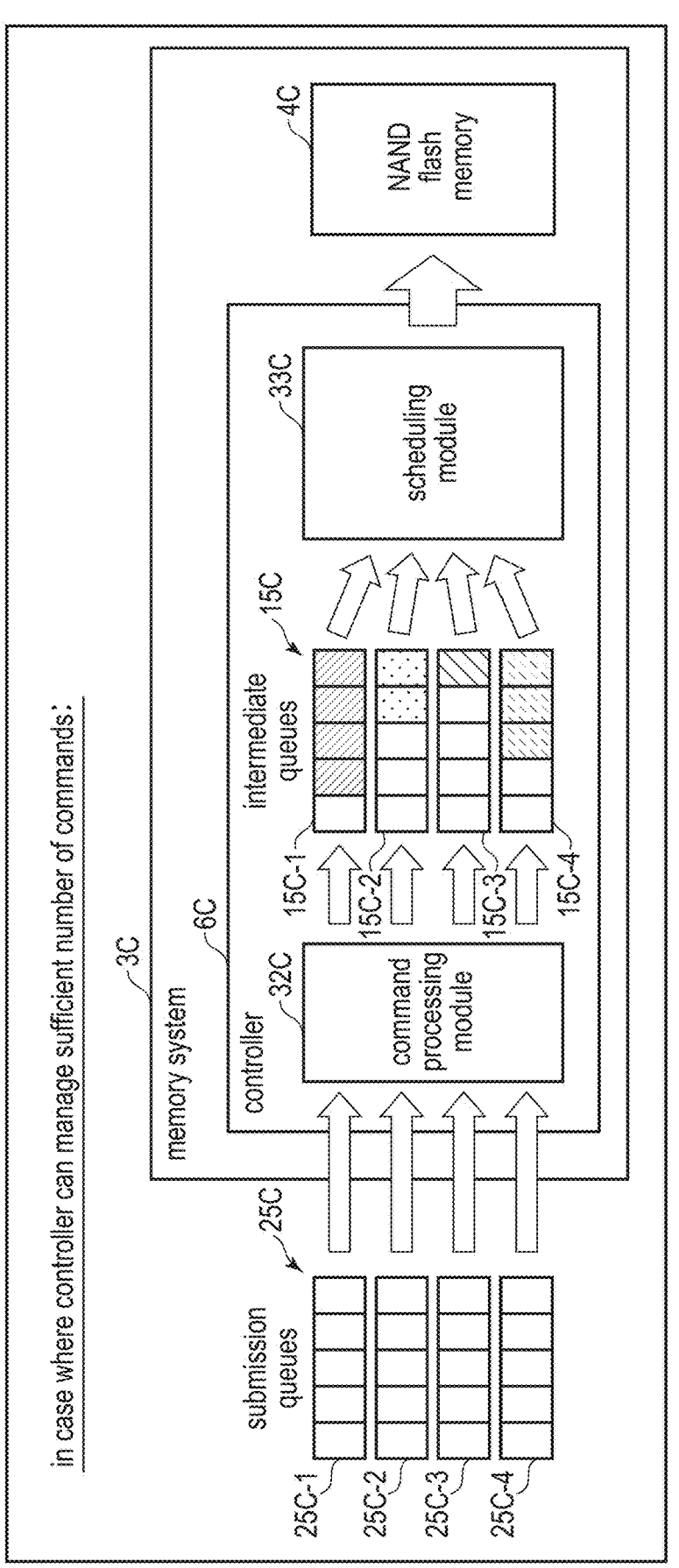
F I G. 9

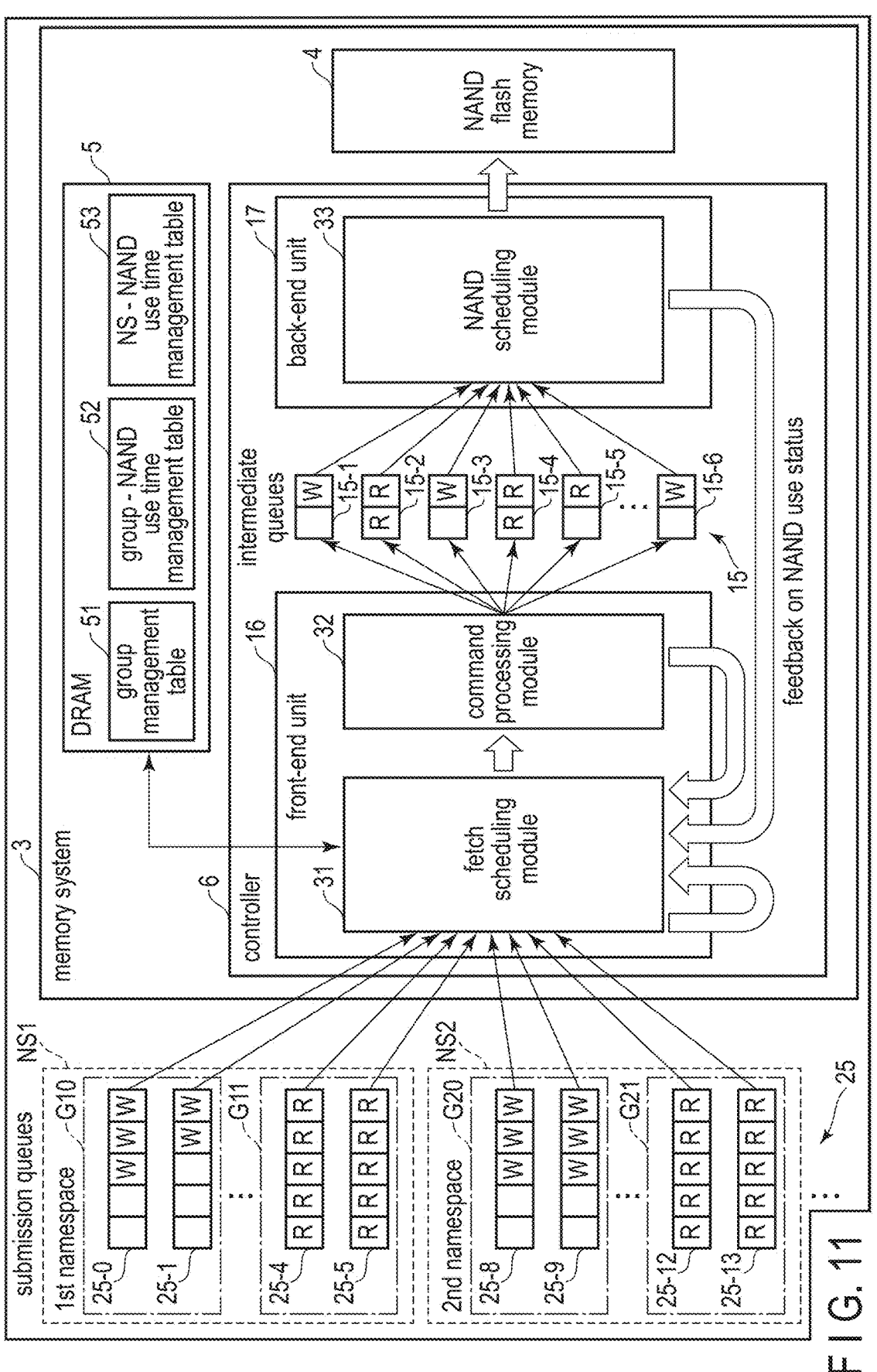
F I G. 11

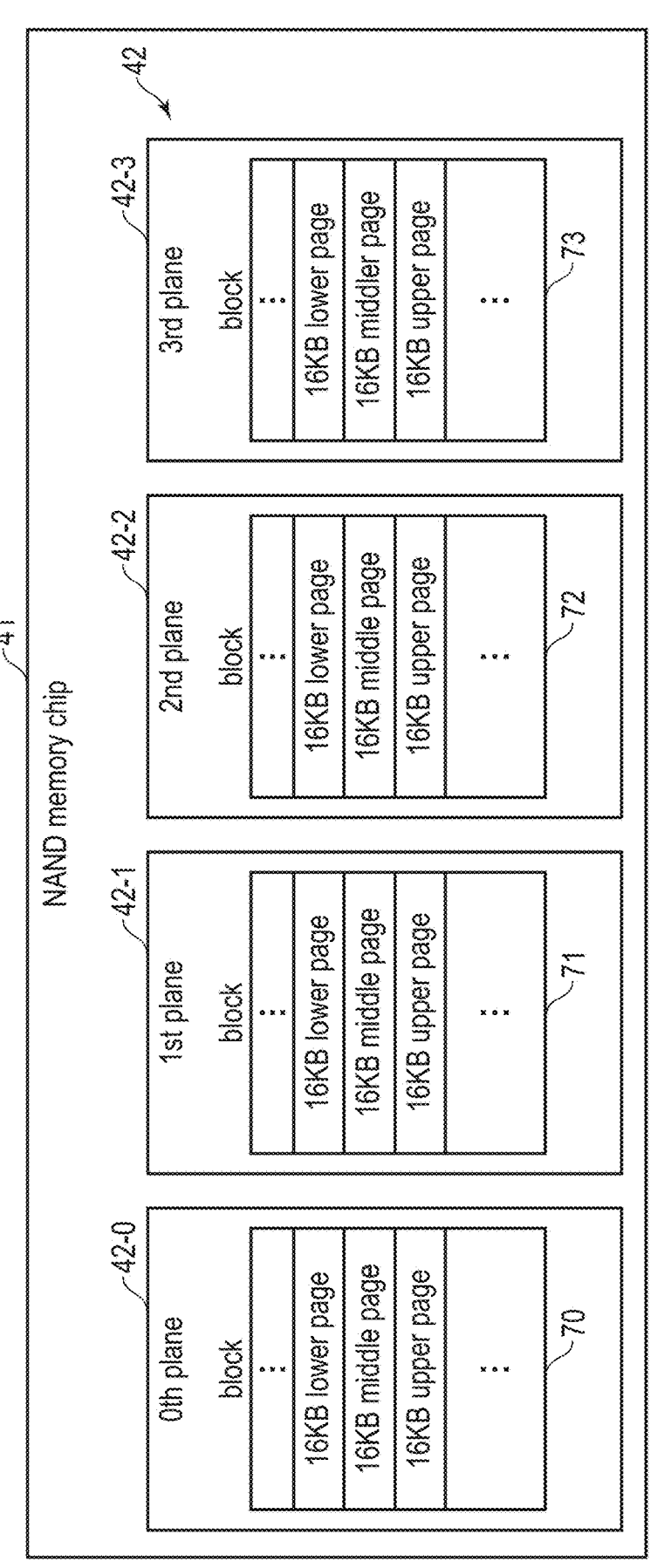
F I G. 12

| command | NAND access size | number of NAND requests | predicted NAND use time |
|---|---|---|---|
| read 4KB | 16KB | 1 | 50 $\mu$ s |
| read 16KB | 16KB | 1 | 50 $\mu$ s |
| read 128KB | 16KB×8 | 8 | 400 $\mu$ s |
| write 16KB | (16KB) | 1/12 (=16/192) | 84 $\mu$ s |
| write 128KB | (128KB) | 2/3 (=128/192) | 667 $\mu$ s |
| write 192KB | 192KB | 1 | 1000 $\mu$ s | read unit : 16KB, write unit : 192KB,
read time tR : 50 $\mu$ s, program time tProg : 1ms

F I G. 13

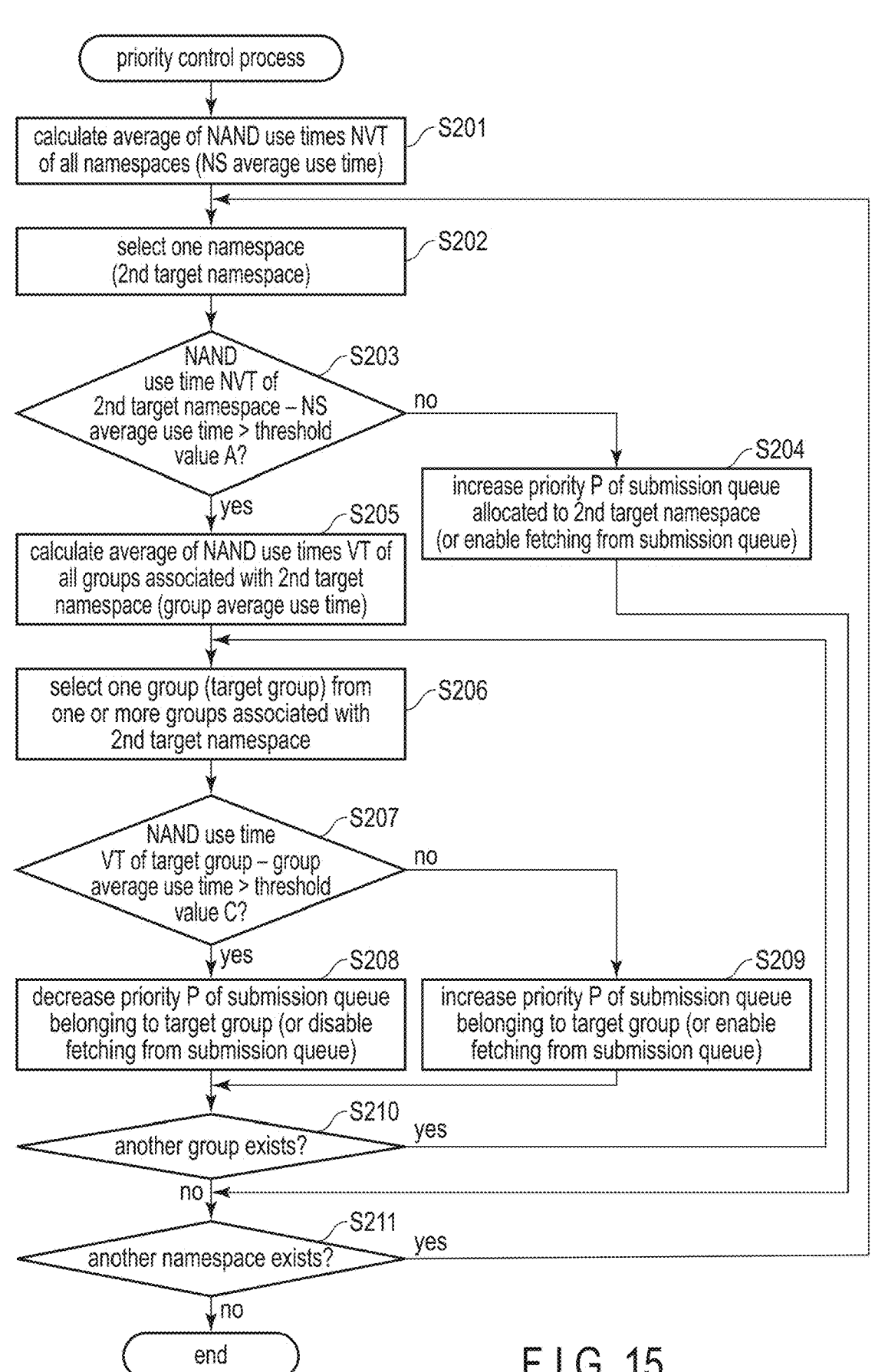
F I G. 15

| namespace (NS) | NAND use time NVT | read - write use time RWVT |
|----------------|-------------------|----------------------------|
| 1 | NVT1 | RWVT1 |
| 2 | NVT2 | RWVT2 |
| ... | ... | ... |

F I G. 16

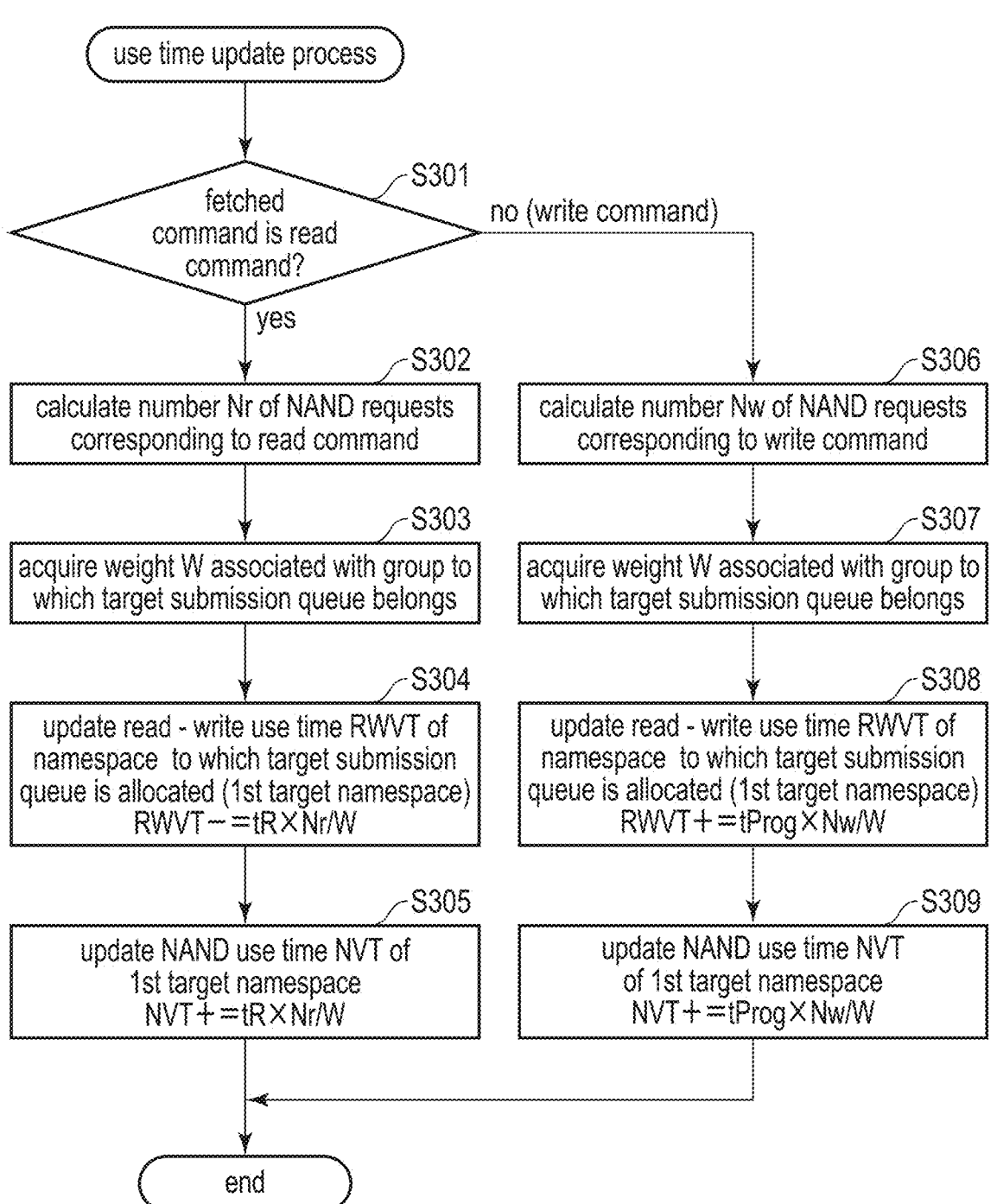
F I G. 17

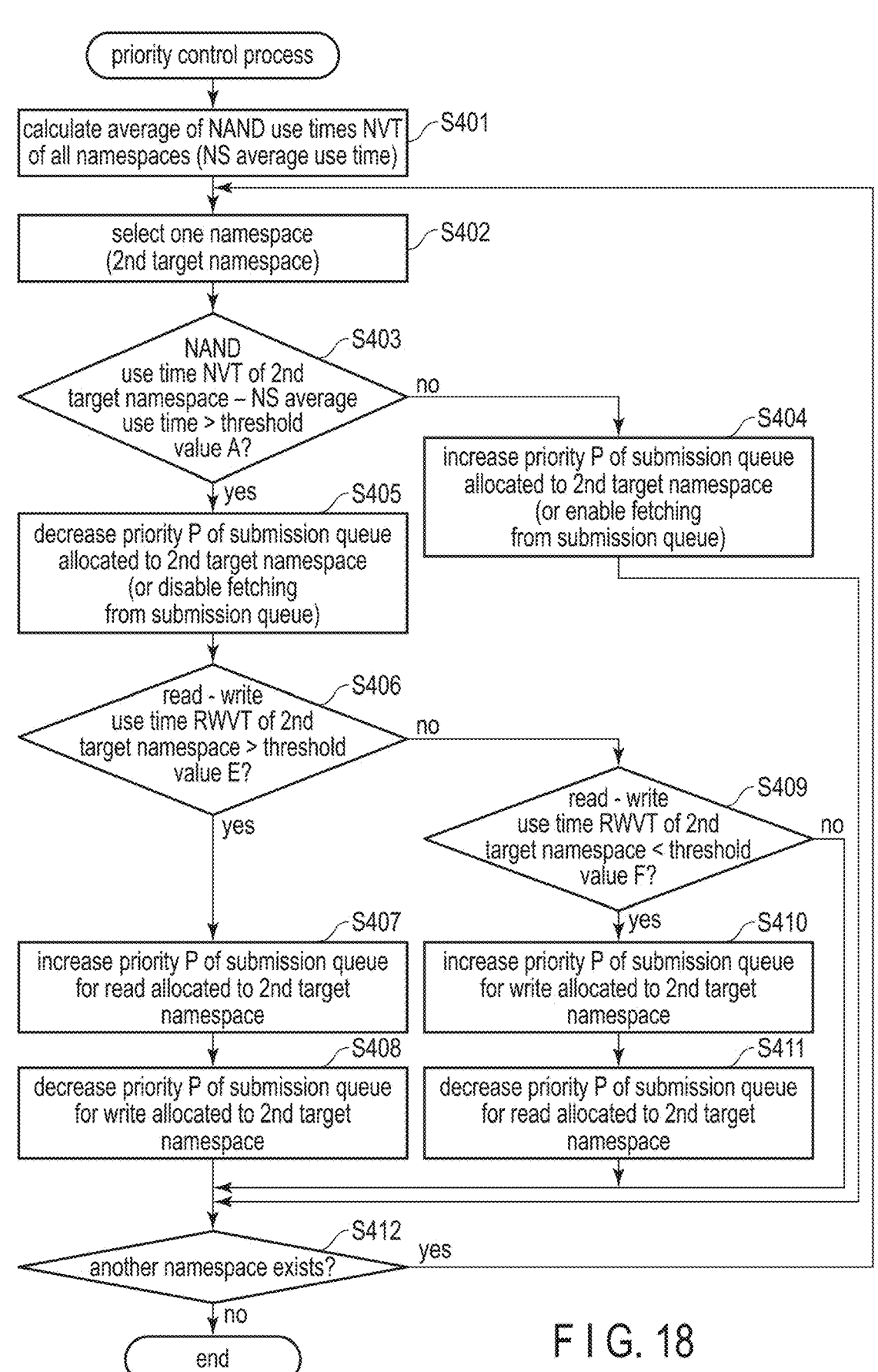
F I G. 18

MEMORY SYSTEM MANAGING MULTIPLE LOGICAL ADDRESS SPACES

CROSS-REFERENCE TO RELATED APPLICATIONS

This application is based upon and claims the benefit of priority from Japanese Patent Application No. 2023-149123, filed Sep. 14, 2023, the entire contents of which are incorporated herein by reference.

FIELD

Embodiments described herein relate generally to a technique for controlling a nonvolatile memory.

BACKGROUND

In recent years, memory systems that include a nonvolatile memory have been widely used. As one of such memory systems, a solid state drive (SSD) that includes a NAND flash memory is known. The SSD is used as a main storage of various computing devices.

The memory system performs a process for the nonvolatile memory in accordance with a command received from a host.

More specifically, the host includes, for example, a submission queue (SQ). The submission queue is capable of storing one or more commands to be executed in the memory system.

The memory system receives a command from the host by fetching the command from the submission queue. Then, the memory system executes a process in accordance with the received command.

The submission queue may be allocated to a logical address space. The logical address space includes one or more logical addresses. The logical address is used by the host for addressing a storage area of the memory system.

The memory system may provide the host with a plurality of logical address spaces. Each of the logical address spaces is also referred to as a namespace. To each of the logical address spaces, for example, one or more submission queues are allocated. Each of the submission queues stores a command that designates a logical address in a corresponding logical address space.

BRIEF DESCRIPTION OF THE DRAWINGS

FIG. 1 is a block diagram illustrating an example of a configuration of an information processing system that includes a memory system according to an embodiment.

FIG. 2 is a diagram illustrating an example of a configuration of a NAND memory chip included in the memory system according to the embodiment.

FIG. 3 is a diagram illustrating an example of a group management table used in the memory system according to the embodiment.

FIG. 4 is a diagram illustrating an example of a group-NAND use time management table used in the memory system according to the embodiment.

FIG. 5 is a diagram illustrating an example of a namespace-NAND use time management table used in the memory system according to the embodiment.

FIG. 6 is a diagram illustrating an example in which a NAND flash memory is used unevenly between two submission queues, in a memory system according to a comparative example.

FIG. 7 is a diagram illustrating an example in which a NAND flash memory is used evenly between the two submission queues, in the memory system according to the embodiment.

FIG. 8 is a block diagram illustrating a configuration of the memory system according to the comparative example.

FIG. 9 is a diagram illustrating a case where a controller can manage sufficient number of commands for using the NAND flash memory evenly between management units, in the memory system according to the comparative example.

FIG. 11 is a block diagram illustrating an example of a specific configuration of a controller in the memory system according to the embodiment.

FIG. 12 is a diagram illustrating an example of a write mode for the NAND flash memory in the memory system of the embodiment.

FIG. 13 is a diagram illustrating an example of relationships between commands from a host and use times of the NAND flash memory, in the memory system according to the embodiment.

FIG. 15 is a flowchart illustrating an example of the procedure of a priority control process executed in the memory system according to the embodiment.

FIG. 16 is a diagram illustrating another example of the namespace-NAND use time management table used in the memory system according to the embodiment.

FIG. 17 is a flowchart illustrating another example of the procedure of the use time update process executed in the memory system according to the embodiment.

FIG. 18 is a flowchart illustrating another example of the procedure of the priority control process executed in the memory system according to the embodiment.

DETAILED DESCRIPTION

Figure 10:
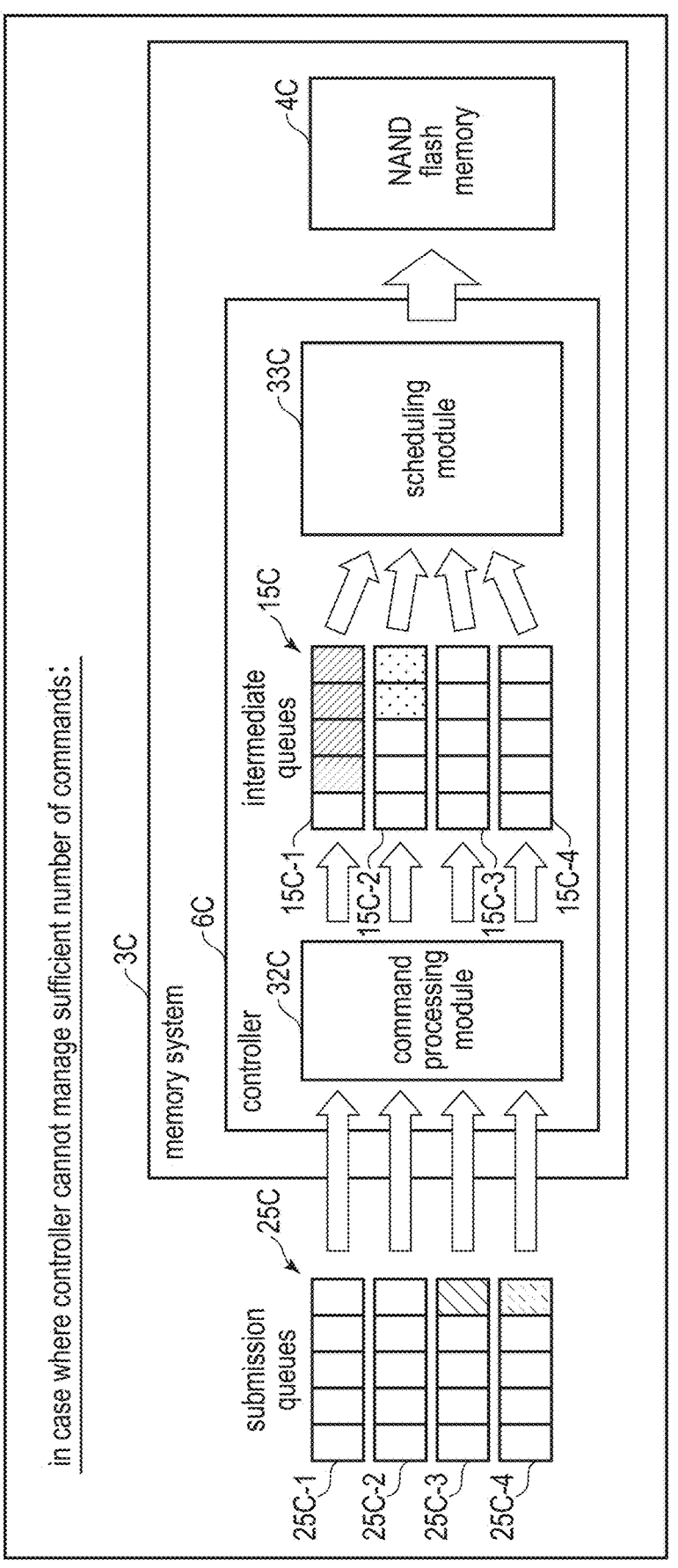
FIG. 10 is a diagram illustrating a case where the controller cannot manage sufficient number of commands for using the NAND flash memory evenly between management units, in the memory system according to the comparative example.

In general, according to one embodiment, a memory system includes a nonvolatile memory and a controller. The controller is electrically connected to the nonvolatile memory. The controller communicates with a host that includes a plurality of queues each being capable of storing one or more commands. The controller provides the host with a plurality of logical address spaces. The plurality of logical address spaces include at least a first logical address space. One or more queues of the plurality of queues are allocated to each of the plurality of logical address spaces. The controller calculates a plurality of first use amounts of the nonvolatile memory that correspond to the plurality of logical address spaces, respectively. The plurality of first use amounts include at least a second use amount that corresponds to the first logical address space. The controller selects a first queue from which a command is to be fetched among the plurality of queues, based on the plurality of first use amounts. The first queue is allocated to the first logical address space. The controller fetches a first command from the first queue. The controller calculates a predicted use amount of the nonvolatile memory. The predicted use amount is an amount of the nonvolatile memory that is to be used in accordance with the first command. The controller updates the second use amount by using the predicted use amount.

Various embodiments will be described hereinafter with reference to the accompanying drawings.

First, a configuration of an information processing system that includes a memory system according to an embodiment will be explained with reference to FIG. 1. The information processing system 1 includes a host device 2 and a memory system 3.

The host device 2 may be a storage server that stores a large amount of various data to the memory system 3, or a personal computer. Hereinafter, the host device 2 is also referred to as a host 2.

The memory system 3 is a storage device configured to write data into a nonvolatile memory and read data from the nonvolatile memory. The nonvolatile memory is, for example, a NAND flash memory 4. The memory system 3 is also referred to as a storage device or a semiconductor storage device. The memory system 3 may be implemented as, for example, a solid state drive (SSD) including the NAND flash memory 4. Hereinafter, a case where the nonvolatile memory is the NAND flash memory 4 will be mainly described as an example.

The memory system 3 may be used as a storage of the host 2. The memory system 3 may be provided inside the host 2 or may be connected to the host 2 via a cable or a network.

An interface for connecting the host 2 to the memory system 3 conforms to standards such as PCI Express™ (PCIe™), Ethernet™, Fibre channel, or NVM Express™ (NVMe™).

The host 2 includes a CPU 21 and a random access memory (RAN) 22. The CPU 21 and the RAM 22 are connected via, for example, a bus 20.

The CPU 21 is, for example, at least one processor. The CPU 21 controls operations of various components of the host 2.

The RAM 22 is a volatile memory. The RAM 22 is, for example, a dynamic random access memory (DRAM) or a static random access memory (SRAM). A storage area of the RAM 22 is allocated as, for example, a plurality of submission queues 25.

Each of the plurality of submission queues 25 is a queue for storing a request issued to the memory system 3 by the host 2. Thus, the host 2 transmits requests to the memory system 3 via the submission queues 25. The request issued to the memory system 3 by the host 2 is, for example, a command. Hereinafter, the request issued to the memory system 3 by the host 2 is also referred to as a command or a host command. Each of the submission queues 25 includes multiple slots to which the host 2 writes commands, respectively, which are issued. A location in each submission queue 25 (that is, a slot) to which the host 2 should write a command is indicated by an SQ tail pointer. A head location in each submission queue 25 from which the memory system 3 should fetch a command is indicated by an SQ head pointer.

The host 2 writes (i.e., issues) a command to a location in the submission queue 25 that is indicated by the SQ tail pointer. Then, the host 2 adds one to the SQ tail pointer. When the value obtained by adding one to the SQ tail pointer has reached the number of slots of the submission queue 25 (that is, the queue size), the host 2 sets the SQ tail pointer to zero. Then, the host 2 writes the updated value of the SQ tail pointer to a SQ tail doorbell register of the memory system 3.

In the example illustrated in FIG. 1, three commands are stored in the submission queue 25. The number of commands stored in the submission queue 25 corresponds to a difference between the SQ head pointer and the SQ tail pointer.

The memory system 3 includes, for example, the NAND flash memory 4, a DRAM 5, and a controller 6.

The NAND flash memory 4 includes one or more NAND memory chips 41. The one or more NAND memory chips 41 are, for example, N NAND memory chips 41-1, . . . , and 41-N. N is an integer of one or larger. Hereinafter, a case where the NAND flash memory 4 includes N NAND memory chips 41-1, . . . , and 41-N will be mainly described. Any one of the N NAND memory chips 41-1, . . . , and 41-N is also simply referred to as a NAND memory chip 41.

FIG. 2 illustrates an example of a configuration of the NAND memory chip 41. The NAND memory chip 41 includes, for example, one or more planes 42. Each of the one or more planes 42 is a unit that performs a data write operation and a data read operation. The number of the planes 42 included in the NAND memory chip 41 is freely set. In FIG. 2, a case where the NAND memory chip 41 includes four planes 42 is illustrated. The four planes 42 are a zeroth plane 42-0, a first plane 42-1, a second plane 42-2, and a third plane 42-3. Any one of the one or more planes 42 is also simply referred to as a plane 42.

The plane 42 includes a memory cell array 421. The memory cell array 421 includes multiple blocks B0, B1, B2, . . . , and Bm−1 each including a plurality of memory cells arranged in matrix. The blocks B0, B1, B2, . . . , and Bm−1 each function as a minimum unit of a data erase operation. The block may also be referred to as an erase block or a physical block. Each of the blocks B0, B1, B2, . . . , and Bm−1 includes multiple pages P0, . . . , and Pn−1. Each of the pages P0, . . . , and Pn−1 includes a plurality of memory cells connected to a single word line. The pages P0, . . . , and Pn−1 each function as a unit of a data write operation and a data read operation. Note that a word line may also function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data program operation to write data in each page of the block.

The NAND memory chip 41 may be implemented as a flash memory configured to store multiple bits per memory cell.

The flash memory configured to store multiple bits per memory cell is, for example, a multi-level cell (MLC) flash memory (a four-level cell (4LC) flash memory), a triple-level cell (TLC) flash memory (an eight-level cell (8LC) flash memory), or a quad-level cell (QLC) flash memory (a sixteen-level cell (16LC) flash memory). The MLC flash memory is configured to store 2-bit data per memory cell. The TLC flash memory is configured to store 3-bit data per memory cell. The QLC flash memory is configured to store 4-bit data per memory cell. A flash memory configured to store 1-bit data per memory cell is also referred to as a single-level cell (SLC) flash memory (a two-level cell (2LC) flash memory).

In a case where the NAND memory chip 41 is implemented as an MLC flash memory, data of two pages is written into memory cells connected to a single word line by writing 2-bit data per memory cell. The data of two pages is composed of lower page data and upper page data. Any area in the MLC flash memory (for example, any one or more blocks) may be used as an area configured to store only one bit per memory cell (i.e., an SLC area). In a write operation to write data into the SLC area, data of only one page is written in memory cells connected to a single word line by writing 1-bit data per memory cell.

In a case where the NAND memory chip 41 is implemented as a TLC flash memory, data of three pages is written into memory cells connected to a single word line by writing 3-bit data per memory cell. The data of three pages is composed of lower page data, middle page data, and upper page data. Any area in the TLC flash memory (for example, any one or more blocks) may be used as the above-described SLC area, or an MLC area configured to store two bits per memory cell. Note that the SLC area and the MLC area may be defined by a unit smaller than a block. In the MLC area, data of only two pages is written into memory cells connected to a single word line by writing 2-bit data per memory cell.

In a case where the NAND memory chip 41 is implemented as a QLC flash memory, data of four pages is written into memory cells connected to a single word line by writing 4-bit data per memory cell. Any area in the QLC flash memory (for example, any one or more blocks) may be used as the SLC area, or may be used as the MLC area, or may be used as a TLC area configured to store three bits per memory cell. The SLC area, the MLC area, and the TLC area may be defined by a unit smaller than a block. In the TLC area, data of only three pages is written into memory cells connected to a single word line by writing 3-bit data per memory cell.

Note that the NAND memory chip 41 may be configured to store five or more bits per memory cell. In this case, any area in the NAND memory chip 41 may be used as an area in which data of only four or less bits is written per memory cell.

The description returns to FIG. 1.

The DRAM 5 is a volatile memory. A storage area of the DRAM 5 is allocated to, for example, a storage area of firmware (FW), a cache area of a logical-to-physical address translation table 50, and storage areas of a group management table 51, a group-NAND use time management table 52, and a namespace-NAND use time management table (NS-NAND use time management table) 53.

The FW is a program for controlling an operation of the controller 6. The FW is loaded from the NAND flash memory 4 to the DRAM 5, for example.

The logical-to-physical address translation table 50 is a table for managing mapping between each logical address and each physical address. The logical address is used by the host 2 for addressing a storage area of the memory system 3. The logical address is, for example, a logical block address (LBA).

The group management table 51 is a table for managing a group of submission queues 25. The group is a management unit to which one or more submission queues 25 belong. For example, one or more submission queues 25 that have the same priority for the memory system 3 to fetch a command, belongs to one group. An example of a specific configuration of the group management table 51 will be described later with reference to FIG. 3. Note that, in the following description, a submission queue 25 with a larger value of a priority means that a command stored in the submission queue 25 is more preferentially fetched.

The group-NAND use time management table 52 is a table for managing a NAND use time per group. The NAND use time is a duration for which the NAND flash memory 4 is used. The NAND use time of a group is the cumulative sum of durations for which the NAND flash memory 4 is used in accordance with commands fetched from submission queues 25 that belong to the group. An example of a specific configuration of the group-NAND use time management table 52 will be described later with reference to FIG. 4.

The NS-NAND use time management table 53 is a table for managing a NAND use time per namespace. The NAND use time of a namespace is a cumulative sum of durations for which the NAND flash memory 4 is used in accordance with commands fetched from submission queues 25 that are allocated to the namespace. An example of a specific configuration of the NS-NAND use time management table 53 will be described later with reference to FIG. 5.

A namespace is a logical address space that includes one or more logical addresses. The memory system 3 may provide the host 2 with a plurality of namespaces. Each of the plurality of namespaces is identified by a namespace ID and includes an independent logical address space. To each of the plurality of namespaces, one or more submission queues 25 are allocated. Each of the submission queues 25 stores, for example, a command that designates a logical address in a corresponding namespace (that is, in a corresponding logical address space). In addition, each of the plurality of namespaces is associated with one or more groups. To each of the one or more groups, at least one submission queue 25 among one or more submission queues 25 that are allocated to an associated namespace may belong.

A storage area of the DRAM 5 may be further allocated as buffer areas that temporarily store data. The buffer areas are, for example, a write buffer 54 and a read buffer 55. The write buffer 54 temporarily stores user data to be written into the NAND flash memory 4. The read buffer 55 temporarily stores user data read from the NAND flash memory 4.

The controller 6 may be implemented with a circuit such as a system-on-a-chip (SoC). The controller 6 is configured to control the NAND flash memory 4. The function of each unit of the controller 6 may be realized by dedicated hardware in the controller 6 or may be realized by a processor executing the FW.

The controller 6 may function as a flash translation layer (FTL) configured to execute data management and block management of the NAND flash memory 4. The data management executed by the FTL includes (1) management of mapping data indicative of a relationship between each logical address and each physical address of the NAND flash memory 4, and (2) process to hide a difference between data read/write operations in units of page and data erase operations in units of block. The block management includes management of defective blocks, wear leveling, and garbage collection.

The management of mapping between each logical address and each physical address is executed by using, for example, the logical-to-physical address translation table 50. The controller 6 uses the logical-to-physical address translation table 50 to manage the mapping between each logical address and each physical address in a certain management size. A physical address corresponding to a logical address indicates a physical memory location in the NAND flash memory 4 to which data of the logical address is stored. The controller 6 manages, by using the logical-to-physical address translation table 50, multiple storage areas that are obtained by logically dividing the storage area of the NAND flash memory 4. These multiple storage areas correspond to multiple logical addresses, respectively. In other words, each of the storage areas is identified by one logical address. The logical-to-physical address translation table 50 may be loaded from the NAND flash memory 4 to the DRAM 5 when the memory system 3 is boot up.

The data write operation into one page is executable only once in a single P/E cycle. Thus, the controller 6 writes updated data corresponding to a logical address not to an original physical memory location in which previous data corresponding to the logical address is stored but to a different physical memory location. Then, the controller 6 updates the logical-to-physical address translation table 50 to associate the logical address with this different physical memory location rather than the original physical memory location and to invalidate the previous data (i.e., data stored in the original physical memory location). Data to which the logical-to-physical address translation table 50 refers (that is, data associated with a logical address) is referred to as valid data. Furthermore, data not associated with any logical address is referred to as invalid data. The valid data is data to be possibly read by the host 2 later. The invalid data is data not to be read by the host 2 anymore.

The controller 6 may instruct the NAND memory chip 41 to execute a data write operation, for example, in any one of an SLC mode, an MLC mode, a TLC mode, and a QLC mode. The SLC mode is a mode in which one bit is written per memory cell. The MLC mode is a mode in which two bits are written per memory cell. The TLC mode is a mode in which three bits are written per memory cell. The QLC mode is a mode in which four bits are written per memory cell.

The controller 6 includes, for example, a DRAM interface (DRAM I/F) 11, an SRAM 12, and a memory controller 13. The DRAM I/F 11, the SRAM 12, and the memory controller 13 are connected, for example, via a bus 10.

The DRAM I/F 11 functions as a DRAM control circuit configured to control access to the DRAM 5.

The SRAM 12 is a volatile memory. A storage area of the SRAM 12 is allocated, for example, as one or more intermediate queues 15. Each of the intermediate queues 15 is configured to store a request to the NAND flash memory 4. The request to the NAND flash memory 4 is referred to as a NAND request. The NAND request is generated on the basis of a command (host command) fetched from the submission queues 25. The one or more intermediate queues 15 correspond to, for example, one or more groups, respectively. An intermediate queue 15 stores one or more NAND requests that correspond to a command fetched from a submission queue 25 that belongs to a group corresponding to the intermediate queue 15. In the intermediate queue 15, one or more NAND requests whose corresponding processes have not been executed may be accumulated. The one or more NAND requests stored in the intermediate queue 15 are processed by the memory controller 13 in a specific order (for example, in the order of their being stored). A NAND request that has been processed is discarded from the intermediate queue 15.

Note that a storage area of the SRAM 12 may be allocated for at least any one of the FW, the logical-to-physical address translation table 50, the group management table 51, the group-NAND use time management table 52, and the NS-NAND use time management table 53. A storage area of the SRAM 12 may be allocated as the write buffer 54 and the read buffer 55.

The memory controller 13 is configured to control various processes on the NAND flash memory 4. Specifically, the memory controller 13 fetches a command from each of the plurality of submission queues 25 and executes a process according to the fetched command for the NAND flash memory 4. The memory controller 13 includes a front-end unit 16 and a back-end unit 17.

The front-end unit 16 controls communication between the host 2 and the memory system 3. By the communication, for example, commands and data are transmitted from the host 2 to the memory system 3.

The front-end unit 16 controls acquisition (i.e., fetch) of commands from the plurality of submission queues 25. Specifically, the front-end unit 16 selects, from the plurality of submission queues 25, a target submission queue 25 from which a command is to be fetched (hereinafter also referred to as a fetch target submission queue 25). The front-end unit 16 fetches a command in order from the head of the fetch target submission queue 25. The command to be fetched is, for example, an input/output (I/O) command or a control command. The I/O command may be a write command or a read command. The control command may be an unmap command (trim command) or a flush command.

The front-end unit 16 may generate one or more requests (NAND requests) to the NAND flash memory 4 on the basis of a command fetched from a submission queue 25. The front-end unit 16 stores the generated NAND requests in an intermediate queue 15 corresponding to a group to which the submission queue 25 belongs.

Specifically, for example, when a read command has been fetched from a submission queue 25, the front-end unit 16 generates one or more NAND requests to the NAND flash memory 4, based on the read command. Each of the NAND requests generated based on the read command is, for example, a data read request to the NAND flash memory 4. The data read request to the NAND flash memory 4 is also simply referred to as a read request. For example, in a case where the size of data read in one data read operation from the NAND flash memory 4 (more specifically, the NAND memory chip 41) is 16 KB, the read request is a request to read data of 16 KB. The size of data read in one data read operation from the NAND memory chip 41 is also referred to as a read unit. The read unit is equivalent to, for example, the size of data of one page.

In addition, for example, when a write command has been fetched from a submission queue 25, the front-end unit 16 generates one or more NAND requests to the NAND flash memory 4, based on the write command. Each of the NAND requests generated based on the write command is, for example, a data write request to the NAND flash memory 4. The data write request to the NAND flash memory 4 is also simply referred to as a write request. For example, in a case where the size of data written in one data write operation to the NAND flash memory 4 (more specifically, the NAND memory chip 41) is 192 KB, the write request is a request to write data of 192 KB. The size of data written in one data write operation to the NAND memory chip 41 is also referred to as a write unit. The write unit is equivalent to, for example, an integer multiple of the size of data of one page.

The back-end unit 17 electrically connects the controller 6 and the NAND flash memory 4. The back-end unit 17 conforms to an interface standard such as a toggle double data rate (DDR) and an open NAND flash interface (ONFI).

The back-end unit 17 functions as a memory control circuit configured to control the NAND flash memory 4. The back-end unit 17 may be connected to the NAND memory chips 41 via multiple channels respectively. By operating the NAND memory chips 41 in parallel, it is possible to broaden an access bandwidth between the controller 6 and the NAND flash memory 4.

The back-end unit 17 performs, for the NAND flash memory 4, a process corresponding to a NAND request stored in each of the intermediate queues 15. Specifically, the back-end unit 17 acquires a NAND request from the intermediate queues 15 so that, for example, the NAND flash memory 4 is used evenly between the namespaces. The back-end unit 17 may acquire a NAND request from the intermediate queues 15 so that the NAND flash memory 4 is used evenly between groups associated with one namespace. The back-end unit 17 performs, for the NAND flash memory 4, a process corresponding to the acquired NAND request.

Here, an example of the configurations of the group management table 51, the group-NAND use time management table 52, and the NS-NAND use time management table 53 will be described.

FIG. 3 illustrates an example of the configuration of the group management table 51. The group management table 51 includes entries that correspond to groups, respectively. The number of the entries included in the group management table 51 corresponds to, for example, the sum of the numbers of groups that are capable of being associated with each of the namespaces. For example, in a case where the memory system 3 provides the host 2 with two namespaces and four groups are capable of being associated with each of the two namespaces, the group management table 51 includes eight entries. Each of the entries includes, for example, a group field, a namespace field (NS field), an I/O type field, a submission queue field (SQ field), a weight field, and a priority field.

The group field indicates identification information of a corresponding group.

The NS field indicates identification information of a namespace (i.e., namespace ID) with which the corresponding group is associated.

The I/O type field indicates an I/O type of the corresponding group. The I/O type represents the type of a command stored in a submission queue 25 that belongs to the corresponding group. In other words, the I/O type represents a use of the submission queue 25 that belongs to the corresponding group. As the I/O type, "write" or "read" is set, for example. When "write" is set as the I/O type, the submission queue 25 that belongs to the corresponding group is a submission queue 25 used for storing write commands (that is, a submission queue 25 for write). When "read" is set as the I/O type, the submission queue 25 that belongs to the corresponding group is a submission queue 25 used for storing read commands (that is, a submission queue 25 for read). When a target to be managed as the corresponding group has not been determined (for example, when an I/O type of the group has not been determined), for example, "N/A" is set in the I/O type field.

The SQ field indicates identification information of a submission queue 25 that belongs to the corresponding group. The SQ field indicates, for example, one or more pieces of identification information that are assigned to one or more submission queues 25, respectively. When a target to be managed as the corresponding group has not been determined (for example, when the host 2 has not notified identification information of a submission queue 25 that belongs to the group), for example, "N/A" is set in the SQ field.

The weight field indicates a weight W used for the corresponding group. The weight W is a coefficient used for calculating a NAND use time of the corresponding group. For example, a larger value of the weight W is set for a group to which a submission queue 25 storing a command to be more preferentially processed belongs. A value set as the weight W is, for example, any value between 1 and 256 inclusive. When a target to be managed as the corresponding group has not been determined (for example, when a weight W of the group has not been determined), "N/A" is set is the weight field.

The priority field indicates a priority P of fetch from a submission queue 25 that belongs to the corresponding group. As the priority P of a group increases, a frequency at which a submission queue 25 that belongs to the group is selected as a fetch target increases. The priority field may indicate whether fetching of a command from a submission queue 25 that belongs to the corresponding group is enabled or not. In this case, when fetching of a command from a submission queue 25 that belongs to the corresponding group is enabled, for example, "enable" is set in the priority field. Further, when fetching of a command from a submission queue 25 that belongs to the corresponding group is disabled, for example, "disable" is set in the priority field. When a target to be managed as the corresponding group has not been determined (for example, when the priority P of the group has not been determined), for example, "N/A" is set in the priority field.

In the example illustrated in FIG. 3, a group "10" is associated with a namespace "1". The I/O type of the group "10" is "write". Submission queues 25 that belong to the group "10" are four submission queues 25 that have pieces of identification information "0", "1", "2", and "3", respectively. A weight used for the group "10" is W10. A priority of fetch from the submission queues 25 that belong to the group "10" is P10.

For example, a group "11" is associated with the namespace "1". The I/O type of the group "11" is "read". Submission queues 25 that belong to the group "11" are four submission queues 25 that have pieces of identification information "4", "5", "6", and "7", respectively. A weight used for the group "11" is W11. A priority of fetch from the submission queues 25 that belong to the group "11" is P11.

For example, both a group "12" and a group "13" are associated with the namespace "1". In each of the fields other than the NS fields of the group "12" and the group "13", "N/A" is set. Therefore, none of targets to be managed as the group "12" and the group "13" has been specified.

Both of a group "21" and a group "22" are set to a namespace "2" and the I/O type "read". In that case, the controller 6 can manage the groups (more specifically, submission queues 25 that belong to each of the groups) set to the same namespace and the same I/O type in different weights W and different priorities P.

Information managed by using the group management table 51 is based on, for example, information notified to the memory system 3 by the host 2. Alternatively, an interface for the host 2 to change contents of the group management table 51 may be provided.

FIG. 4 illustrates an example of the configuration of the group-NAND use time management table 52. The group-NAND use time management table 52 includes entries that correspond to groups, respectively. Each of the entries includes a group field and a NAND use time field.

The group field indicates identification information of a corresponding group.

The NAND use time field indicates use amount of the NAND flash memory 4 by the corresponding group. This use amount is an index indicative of the cumulative sum of processing amounts executed in the NAND flash memory 4 in accordance with one or more commands fetched from one or more submission queues 25 that belong to the corresponding group. The NAND use time field may indicate a value obtained by dividing the use amount by the weight W that is used for the corresponding group. Every time a command is fetched from any of the submission queues 25 that belong to the corresponding group, the value indicated in the NAND use time field is updated by using a predicted use amount of the NAND flash memory 4 in accordance with the command (or by using a value obtained by dividing the predicted use amount by the weight W).

More specifically, this use amount is represented by, for example, a use time VT of the NAND flash memory 4 of the corresponding group (hereinafter also referred to as NAND use time VT). The NAND use time VT is the cumulative sum of durations for which the NAND flash memory 4 is used in accordance with commands fetched from the submission queues 25 that belong to the corresponding group, from a certain time. The NAND use time field may indicate a value obtained by dividing the NAND use time by the weight W that is used for the corresponding group. Every time a command is fetched from any of the submission queues 25 that belong to the corresponding group, the value indicated in the NAND use time field is updated by using a predicted use time of the NAND flash memory 4 in accordance with the command (or by using a value obtained by dividing the predicted use time by the weight W).

Note that when a target to be managed as the corresponding group has not been determined in the group management table 51, "N/A" is set in the NAND use time field of the group-NAND use time management table 52.

In the example illustrated in FIG. 4, the NAND use time of the group "10" is, for example, VT10. The NAND use time of the group "11" is, for example, VT11. The NAND use time of the group "20" is, for example, VT20. The NAND use time of the group "21" is, for example, VT21. The NAND use time of the group "22" is, for example, VT22. In addition, the NAND use time of each of the group "12", the group "13", and a group "23" is "N/A". This means that none of targets to be managed as the group "12", the group "13", and the group "23" has been specified.

FIG. 5 illustrates an example of the configuration of the NS-NAND use time management table 53. The NS-NAND use time management table 53 includes entries that correspond to namespaces, respectively. The number of the entries included in the NS-NAND use time management table 53 corresponds to, for example, the number of namespaces with which the memory system 3 provides the host 2. For example, when the memory system 3 provides the host 2 with two namespaces, the NS-NAND use time management table 53 includes two entries. Each of the entries includes, for example, a namespace field (NS field) and a NAND use time field.

The NS field indicates identification information (namespace ID) of a corresponding namespace.

The NAND use time field indicates a use amount of the NAND flash memory 4 used by the corresponding namespace. This use amount is an index indicative of the cumulative sum of processing amounts executed in the NAND flash memory 4 in accordance with one or more commands fetched from one or more submission queues 25 allocated to the corresponding namespace. Every time a command is fetched from any of the submission queues 25 allocated to the namespace, the value indicated in the NAND use time field is updated by using a predicted use amount of the NAND flash memory 4 in accordance with the command (or by using a value obtained by dividing the predicted use amount by the weight W).

More specifically, this use amount is represented by a use time NVT of the NAND flash memory 4 of the corresponding namespace (NAND use time NVT). The NAND use time NVT is the cumulative sum of durations for which the NAND flash memory 4 is used in accordance with commands fetched from the submission queues 25 allocated to the corresponding namespace, from a certain time. Each of the submission queues 25 allocated to the namespace belongs to any of the groups associated with the namespace. Therefore, the NAND use time NVT of a namespace is the sum of the NAND use times VT of all the groups associated with the namespace. The NAND use time NVT of the namespace is updated, for example, every time the NAND use time VT of any one of the groups associated with the namespace is updated.

Hereinafter, a case where the use amount of the NAND flash memory 4 is represented by a use time will be mainly described. However, the use amount of the NAND flash memory 4 may be replaced with various indices indicative of a processing amount in the NAND flash memory 4.

In the example illustrated in FIG. 5, the NAND use time of the namespace "1" is, for example, NVT1. When the group management table 51 illustrated in FIG. 3 and the group-NAND use time management table 52 illustrated in FIG. 4 are used, the groups "10", "11", "12", and "13" belong to the namespace "1". Since "N/A" is set as the NAND use time VT of each of the groups "12" and "13", the NAND use time NVT1 of the namespace "1" is obtained by calculating the sum of the NAND use time VT10 of the group "10" and the NAND use time VT11 of the group "11".

In addition, the NAND use time of the namespace "2" is NVT2. In a case where the group management table 51 illustrated in FIG. 3 and the group-NAND use time management table 52 illustrated in FIG. 4 are used, the groups "20", "21", "22", and "23" belong to the namespace "2". Since "N/A" is set as the NAND use time VT of the group "23", the NAND use time NVT2 of the namespace "2" is obtained by calculating the sum of the NAND use time VT20 of the group "20", the NAND use time VT21 of the group "21", and the NAND use time VT22 of the group "22".

Here, an evenness of use of the NAND flash memory 4 between specific management units will be explained. It is requested for the memory system 3 that the NAND flash memory 4 be used evenly between the specific management units. The specific management units are, for example, submission queues 25, groups of submission queues 25, or namespaces.

First, a case where a NAND flash memory in a memory system 3C according to a comparative example is used unevenly between submission queues will be described below.

FIG. 6 illustrates an example in which the NAND flash memory is used unevenly between two submission queues, in the memory system 3C of the comparative example. The two submission queues are a first submission queue 25C-1 and a second submission queue 25C-2. It is assumed that the size of data read in one data read operation on the NAND memory (read unit) is 16 KB.

The first submission queue 25C-1 is used for a workload that includes read commands each requesting to read user data of 64 KB (hereinafter referred to as read commands of 64 KB). The read commands of 64 KB are continuously stored in the first submission queue 25C-1. Specifically, read commands of 64 KB C11, C12, C13, C14, C15, ..., are stored in the first submission queue 25C-1 in this order.

The second submission queue 25C-2 is used for a workload that includes read command each requesting to read user data of 16 KB (hereinafter referred to as read commands of 16 KB). The read commands of 16 KB are continuously stored in the second submission queue 25C-2.

Specifically, read commands of 16 KB C21, C22, C23, C24, C25, . . . , are stored in the second submission queue 25C-2 in this order.

In the example illustrated in FIG. 6, four read requests that are based on a read command of 64 KB fetched from the first submission queue 25C-1 and one read request that is based on a read command of 16 KB fetched from the second submission queue 25C-2 are alternately issued to the NAND flash memory.

Specifically, first, four read requests R11, R12, R13, and R14 that are based on the read command C11 of 64 KB fetched from the first submission queue 25C-1 are issued to the NAND flash memory. A read request R21 that is based on the read command C21 of 16 KB fetched from the second submission queue 25C-2 is issued to the NAND flash memory. Four read requests R15, R16, R17, and R18 that are based on the read command C12 of 64 KB fetched from the first submission queue 25C-1 are issued to the NAND flash memory. Then, a read request R22 that is based on the read command C22 of 16 KB fetched from the second submission queue 25C-2 is issued to the NAND flash memory.

The read requests R11 to R18 correspond to the read commands fetched from the first submission queue 25C-1. Therefore, a NAND use time of the first submission queue 25C-1 corresponds to time required for read operations in the NAND flash memory in accordance with the eight read requests R11 to R18.

The read requests R21 and R22 correspond to the read commands fetched from the second submission queue 25C-2. Therefore, a NAND use time of the second submission queue 25C-2 corresponds to time required for read operations in the NAND flash memory in accordance with the two read requests R21 and R22.

Thus, in the example illustrated in FIG. 6, the NAND use time of the first submission queue 25C-1 is longer than the NAND use time of the second submission queue 25C-2. Therefore, in the memory system 3C of the comparative example, the NAND flash memory is used unevenly between the first submission queue 25C-1 and the second submission queue 25C-2.

The case where the read commands are stored in the submission queues 25C-1 and 25C-2 is described with reference to FIG. 6. Similarly, in a case where write commands are stored in the submission queues 25C-1 and 25C-2, the NAND flash memory may be used unevenly between the first submission queue 25C-1 and the second submission queue 25C-2.

In contrast, a case where the NAND flash memory 4 in the memory system 3 of the present embodiment is used evenly between the submission queues 25 will be explained.

FIG. 7 illustrates an example in which the NAND flash memory 4 in the memory system 3 is used evenly between two submission queues 25. The two submission queues 25 are a first submission queue 25-1 and a second submission queue 25-2. It is assumed that the size of data read in one data read operation on the NAND memory 4 (read unit) is 16 KB.

The read commands C11, C12, C13, C14, C15, . . . , stored in the first submission queue 25-1 and the read commands C21, C22, C23, C24, C25, . . . , stored in the second submission queue 25-2 are the same as those in the comparative example described with reference to FIG. 6.

In the example illustrated in FIG. 7, one read request of four read requests that are based on a read command of 64 KB fetched from the first submission queue 25-1 and one read request that is based on a read command of 16 KB fetched from the second submission queue 25-2 are alternately issued to the NAND flash memory 4.

Specifically, first, the first read request R11 among four read requests R11, R12, R13, and R14 that are based on the read command C11 of 64 KB fetched from the first submission queue 25-1 is issued to the NAND flash memory 4. A read request R21 that is based on the read command C21 of 16 KB fetched from the second submission queue 25-2 is issued to the NAND flash memory 4. The second read request R12 among the four read requests R11, R12, R13, and R14 is issued to the NAND flash memory 4. A read request R22 that is based on the read command C22 of 16 KB fetched from the second submission queue 25-2 is issued to the NAND flash memory 4. The third read request R13 among the four read requests R11, R12, R13, and R14 is issued to the NAND flash memory 4. A read request R23 that is based on the read command C23 of 16 KB fetched from the second submission queue 25-2 is issued to the NAND flash memory 4. The fourth read request R14 among the four read requests R11, R12, R13, and R14 is issued to the NAND flash memory 4. A read request R24 that is based on the read command C24 of 16 KB fetched from the second submission queue 25-2 is issued to the NAND flash memory 4. The first read request R15 among four read requests that are based on the read command C12 of 64 KB fetched from the first submission queue 25-1 is issued to the NAND flash memory 4. Then, a read request R25 that is based on the read command C25 of 16 KB fetched from the second submission queue 25-2 is issued to the NAND flash memory 4.

The read requests R11, R12, R13, R14, and R15 correspond to the read commands fetched from the first submission queue 25-1. Therefore, the NAND use time of the first submission queue 25-1 corresponds to time required for read operations in the NAND flash memory 4 in accordance with the five read requests R11, R12, R13, R14, and R15.

The read requests R21, R22, R23, R24, and R25 correspond to the read commands fetched from the second submission queue 25-2. Therefore, the NAND use time of the second submission queue 25-2 corresponds to time required for read operations in the NAND flash memory 4 in accordance with the five read requests R21, R22, R23, R24, and R25.

Thus, in the example illustrated in FIG. 7, the NAND use time of the first submission queue 25-1 is equal to the NAND use time of the second submission queue 25-2. Therefore, in the memory system 3, the NAND flash memory 4 can be used evenly between the first submission queue 25-1 and the second submission queue 25-2.

The case where the read commands are stored in the submission queues 25-1 and 25-2 is described with reference to FIG. 7. Similarly, in a case where write commands are stored in the submission queues 25-1 and 25-2, the NAND flash memory can be used evenly between the first submission queue 25-1 and the second submission queue 25-2.

With reference to FIG. 8 to FIG. 10, a case where the NAND flash memory is used unevenly between the management units due to a configuration and operations of the memory system 3C according to the comparative example will be further explained.

FIG. 8 illustrates the configuration of the memory system 3C according to the comparative example. The memory system 3C includes a controller 6C and a NAND flash memory 4C.

The controller 6C is configured to fetch a command from each of a plurality of submission queues 25C and executes a process for the NAND flash memory 4C in accordance with the fetched command. The controller 6C includes a command processing module 32C, a plurality of intermediate queues 15C, and a scheduling module 33C.

Here, the plurality of intermediate queues 15C are four intermediate queues 15C-1, 15C-2, 15C-3, and 15C-4. The four intermediate queues 15C-1, 15C-2, 15C-3, and 15C-4 correspond to four management units, respectively.

The plurality of submission queues 25C are four submission queues 25C-1, 25C-2, 25C-3, and 25C-4. The four submission queues 25C-1, 25C-2, 25C-3, and 25C-4 correspond to the four management units, respectively.

The command processing module 32C selects a fetch target submission queue 25C from the submission queues 25C-1, 25C-2, 25C-3, and 25C-4. The command processing module 32C uses round robin as an arbitration mechanism for the submission queues 25C-1, 25C-2, 25C-3, and 25C-4. In other words, the command processing module 32C selects the submission queues 25C-1, 25C-2, 25C-3, and 25C-4 one by one in a specific order.

The command processing module 32C fetches a command from the selected submission queue 25C. The command processing module 32C generates one or more NAND requests to the NAND flash memory 4C, based on the fetched command. The command processing module 32C stores the one or more NAND requests in a corresponding intermediate queue 15C.

The scheduling module 33C schedules processes corresponding to NAND requests stored in the intermediate queues 15C-1, 15C-2, 15C-3, and 15C-4. Specifically, the scheduling module 33C acquires a NAND request of a processing target from the intermediate queues 15C-1, 15C-2, 15C-3, and 15C-4 so that the NAND flash memory 4C is used evenly between the management units. The scheduling module 33C executes a process for the NAND flash memory 4C, based on the acquired NAND request. Note that in a case where the NAND flash memory 4C includes a plurality of NAND memory chips, the scheduling module 33C executes the scheduling per NAND memory chip.

In order for the scheduling module 33C to acquire a NAND request from the intermediate queues 15C-1, 15C-2, 15C-3, and 15C-4 so that the NAND flash memory 4C is used evenly between the management units, a sufficient number of commands have to be managed in the controller 6C. More specifically, for example, a sufficient number of the NAND requests have to be stored in each of the intermediate queues 15C-1, 15C-2, 15C-3, and 15C-4.

In order to increase the number of commands that can be managed by the controller 6C, the amount of hardware resources (HW resources) of the controller 6C for managing commands needs to be increased. The HW resources include, for example, a memory (for example, RAM) that stores information on commands, such as the intermediate queues 15C. However, an increase in the HW resources leads to an increase in cost of the memory system 3C. If, for example, a relatively small memory is used to avoid the increase in cost of the memory system 3C, the controller 6C may not be able to manage the sufficient number of commands for the upper limit of commands that are required to be simultaneously managed based on a specification of the controller 6C (for example, NVMe).

FIG. 9 illustrates a case where the controller 6C can manage sufficient number of commands for using the NAND flash memory 4C evenly between management units, in the memory system 3C of the comparative example. In the controller 6C, sufficient number of NAND requests for using the NAND flash memory 4C evenly between the management units are stored in the intermediate queues 15C-1, 15C-2, 15C-3, and 15C-4. Specifically, the intermediate queue 15C-1 stores four NAND requests. The intermediate queue 15C-2 stores two NAND requests. The intermediate queue 15C-3 stores one NAND request. The intermediate queue 15C-4 stores three NAND requests.

In this case, the scheduling module 33C can acquire a NAND request from the intermediate queue 15C that corresponds to any one of the four management units. Therefore, the scheduling module 33C can schedule execution of processes in accordance with the NAND requests stored in the intermediate queues 15C-1, 15C-2, 15C-3, and 15C-4 so that the NAND flash memory 4C is used evenly among the management units.

Specifically, for example, the scheduling module 33C acquires NAND requests from the respective intermediate queues 15C-1, 15C-2, 15C-3, and 15C-4 in order and executes processes for the NAND flash memory 4C on the basis of the acquired NAND requests. Thus, the memory system 3C can use the NAND flash memory 4C evenly among the management units.

In contrast, FIG. 10 illustrates t a case where the controller 6C cannot manage sufficient number of commands for using the NAND flash memory 4C evenly between the management units, in the memory system 3C of the comparative example. In the controller 6C, sufficient number of NAND requests for using the NAND flash memory 4C evenly between the management units are not stored in the intermediate queues 15C-1, 15C-2, 15C-3, and 15C-4. Specifically, the intermediate queue 15C-1 stores four NAND requests. The intermediate queue 15C-2 stores two NAND requests. However, neither the intermediate queue 15C-3 nor the intermediate queue 15C-4 stores any NAND requests.

In this case, the scheduling module 33C can acquire the NAND requests from the respective intermediate queues 15C-1 and 15C-2, but cannot acquire a NAND request from the intermediate queue 15C-3 or 15C-4. This prevents the scheduling module 33C from scheduling execution of processes in accordance with the NAND requests stored in the intermediate queues 15C-1, 15C-2, 15C-3, and 15C-4 for using the NAND flash memory 4C evenly among the management units.

Specifically, for example, the scheduling module 33C acquires the NAND requests from the respective intermediate queues 15C-1 and 15C-2 in order and executes processes for the NAND flash memory 4C on the basis of the acquired NAND requests. However, since the scheduling module 33C cannot acquire any NAND request from the intermediate queue 15C-3 or 15C-4, the scheduling module 33C cannot execute a corresponding process for the NAND flash memory 4C. Accordingly, the NAND flash memory 4C is used for the two management units corresponding to the respective intermediate queues 15C-1 and 15C-2, but the NAND flash memory 4C is not used for the two management units corresponding to the respective intermediate queues 15C-3 and 15C-4. Thus, in the memory system 3C, the NAND flash memory 4C is used unevenly among the management units.

As described above, the controller 6C of the memory system 3C according to the comparative example may not be able to manage sufficient number of commands for using the NAND flash memory 4C evenly between the management units in some cases. Therefore, in the memory system 3C, the NAND flash memory 4C may be used unevenly between the management units.

In contrast, in the memory system 3 according to the present embodiment, the controller 6 is configured to manage sufficient number of commands for using the NAND flash memory 4 evenly between management units. Specifically, the controller 6 manages a plurality of use amounts of the NAND flash memory 4 (for example, a plurality of NAND use times) that correspond to a plurality of namespaces, respectively. When having acquired a command from a submission queue 25, the controller 6 calculates a predicted use amount of the NAND flash memory 4 in accordance with the acquired command (hereinafter simply referred to as a predicted use amount). The controller 6 updates a use amount corresponding to a namespace to which the submission queue 25 is allocated, by using the calculated predicted use amount. Then, the controller 6 selects a submission queue 25 from which a command is to be fetched among the plurality of submission queues 25 by using the plurality of use amounts that correspond to the plurality of namespaces, respectively.

The controller 6 selects a submission queue 25 (or increases selection frequency of a submission queue 25) that is allocated to a namespace having small use amount, to fetch a command therefrom. Thus, the controller 6 can manage sufficient number of commands with respect to the namespace for using the NAND flash memory 4 evenly between the namespaces. Then, the controller 6 can schedule issuance of commands (more specifically, NAND requests corresponding to the commands) so that the NAND flash memory 4 is used evenly between the namespaces. Therefore, the memory system 3 can improve an evenness of use of the NAND flash memory 4 between the namespaces.

Furthermore, the controller 6 does not select a submission queue 25 (or decreases selection frequency of a submission queue 25) that is allocated to a namespace having a large use amount, to fetch a command therefrom. This prevents the controller 6 from excessively fetching commands with respect to the namespace and wasting resources for managing the commands. Therefore, it is possible to reduce resources of the memory system 3 for managing commands, for example, compared to the memory system 3C of the comparative example.

FIG. 11 illustrates an example of a specific configuration of the controller 6 of the memory system 3.

The controller 6 is configured to fetch a command from each of the plurality of submission queues 25 and execute a process for the NAND flash memory 4 in accordance with the fetched command. In addition, the controller 6 controls fetching of commands from the plurality of submission queues 25 so that the NAND flash memory 4 is used evenly between the namespaces.

In the controller 6, the front-end unit 16 includes a fetch scheduling module 31 and a command processing module 32. The back-end unit 17 includes a NAND scheduling module 33.

Here, a case where the plurality of submission queues 25 include submission queues 25-0, 25-1, 25-4, 25-5, 25-8, 25-9, 25-12, and 25-13, and the plurality of intermediate queues 15 include intermediate queues 15-1, 15-2, 15-3, 15-4, 15-5, and 15-6 will be explained. The number of the submission queues 25 and the number of the intermediate queues 15 are freely determined.

The submission queues 25-0 and 25-1 are used for storing write commands. The submission queues 25-0 and 25-1 belong to a group G10. In other words, the I/O type of the group G10 is "write".

The submission queues 25-4 and 25-5 are used for storing read commands. The submission queues 25-4 and 25-5 belong to a group G11. In other words, the I/O type of the group G11 is "read".

The submission queues 25-0, 25-1, 25-4, and 25-5 are allocated to a first namespace NS1. In other words, the first namespace NS1 is associated with the groups G10 and G11.

The submission queues 25-8 and 25-9 are used for storing write commands. The submission queues 25-8 and 25-9 belong to a group G20. In other words, the I/O type of the group G20 is "write".

The submission queues 25-12 and 25-13 are used for storing read commands. The submission queues 25-12 and 25-13 belong to a group G21. In other words, the I/O type of the group G21 is "read".

The submission queues 25-8, 25-9, 25-12, and 25-13 are allocated to a second namespace NS2. In other words, the second namespace NS2 is associated with the groups G20 and G21.

The groups G10, G11, G20, and G21 correspond to the entries of the four groups "10", "11", "20", and "21", respectively, in the group management table 51 described above with reference to FIG. 3.

The intermediate queues 15-1, 15-2, 15-3, 15-4, 15-5, and 15-6 correspond to six management units, respectively. Each of the management units is, for example, a group. Specifically, for example, the intermediate queue 15-1 corresponds to the group G10. The intermediate queue 15-2 corresponds to the group G11. The intermediate queue 15-3 corresponds to the group G20. The intermediate queue 15-4 corresponds to the group G21. Similarly, each of the intermediate queues 15-5 and 15-6 corresponds to one group (not illustrated).

Since the I/O type of the group G10 is "write", the intermediate queue 15-1 is used for storing write requests. Since the I/O type of the group G11 is "read", the intermediate queue 15-2 is used for storing read requests. Since the I/O type of the group G20 is "write", the intermediate queue 15-3 is used for storing write requests. Since the I/O type of the group G21 is "read", the intermediate queue 15-4 is used for storing read requests.

The fetch scheduling module 31 schedules the fetching of commands from the plurality of submission queues 25. Specifically, for example, the fetch scheduling module 31 manages a priority P for selecting each of the plurality of submission queues 25 as the fetch target submission queue 25. The fetch scheduling module 31 manages the priority P of each of the submission queues 25, for example, per management unit. In a case where the management unit is a group, the priority P for selecting each of one or more submission queues 25 that belongs to the group as the fetch target submission queue 25, is set for the group. For the management of the priority P, for example, the group management table 51 is used.

Based on the priority P corresponding to each of the plurality of submission queues 25 (for example, the priority P set to the group to which each of the submission queues 25 belongs), the fetch scheduling module 31 more frequently selects a submission queue 25 that has a higher priority P as the fetch target submission queue 25. The fetch scheduling module 31 fetches a command from the fetch target submission queue 25. The fetch scheduling module 31 transmits the fetched command to the command processing module 32.

In addition, the fetch scheduling module 31 manages a NAND use time VT of each of the groups G10, G11, G20, and G22 and a NAND use time NVT of each of the namespaces NS1 and NS2. For the management of the NAND use time VT of each of the groups G10, G11, G20, and G22, for example, the group-NAND use time management table 52 is used. For the management of the NAND use time NVT of each of the namespaces NS1 and NS2, for example, the NS-NAND use time management table 53 is used.

The management of the NAND use time VT of each of the groups will be described in detail.

Based on a fetched command, the fetch scheduling module 31 updates a NAND use time VT of a group to which a submission queue 25 from which the command has been fetched belongs (hereinafter referred to as a belonging group).

Specifically, the fetch scheduling module 31 calculates a predicted use time of the NAND flash memory 4 in accordance with the fetched command. The predicted use time of the NAND flash memory 4 in accordance with the fetched commands is also referred to as a predicted NAND use time.

The fetch scheduling module 31 updates the NAND use time VT of the belonging group in the group-NAND use time management table 52 by using the predicted NAND use time, which has been calculated. For example, the fetch scheduling module 31 adds the predicted NAND use time to the NAND use time VT of the belonging group in the group-NAND use time management table 52. Alternatively, the fetch scheduling module 31 adds, to the NAND use time VT of the belonging group in the group-NAND use time management table 52, a quotient that is obtained by dividing the predicted NAND use time by a weight W that is used for the belonging group.

An example of a method of calculating the predicted NAND use time will be described with reference to FIG. 12 and FIG. 13. Here, it is assumed that a write mode illustrated in FIG. 12 is used.

FIG. 12 illustrates an example of a write mode for the NAND flash memory 4. A data write operation on one NAND memory chip 41 is executed for a single block, or for a plurality of blocks that are included in a plurality of planes 42, respectively, in the NAND memory chip 41. Executing a data write operation for the blocks in the respective planes 42 is also referred to as multi-plane program. In a case where the NAND memory chip 41 includes the plurality of planes 42, the multi-plane program is used in consideration of the programming performance, for example.

In FIG. 12, an example in which data is written, in the TLC mode, into four blocks 70, 71, 72, 73 that are included in four planes 42-0, 42-1, 42-2, and 42-3, respectively, in one data write operation on the NAND memory chip 41 is illustrated. When the data is programed into each of the four blocks 70, 71, 72, and 73 in the TLC mode, data of three pages (lower page data, middle page data, and upper page data) is transferred to each of the four planes 42-0, 42-1, 42-2, and 42-3. The transferred data of three pages is written into a corresponding block in the TLC mode. Here, it is assumed that the size of data of one page is 16 KB.

In this case, in the data write operation on the NAND memory chip 41, data of 192 KB (=16 KB×3 pages×4 blocks) is written. In other words, the size of data that can be written into the NAND memory chip 41 in the data write operation (write unit) is 192 KB.

In addition, in one data read operation on the NAND memory chip 41, data of 16 KB (i.e., data of one page) is read. In other words, the size of data that can be read from the NAND memory chip 41 in the data read operation (read unit) is 16 KB.

When having fetched a command from the submission queues 25, the fetch scheduling module 31 calculates the number of NAND requests to be issued to the NAND memory chip 41 in accordance with the command.

For example, when having fetched a read command from the submission queues 25, the fetch scheduling module 31 calculates the number Nr of read requests issued to the NAND memory chip 41 in accordance with the read command. The size of user data requested to be read in accordance with the read command may be smaller than the read unit or may be larger than the read unit. The fetch scheduling module 31 estimates the number Nr of read requests to be issued to the NAND memory chip 41, based on the size of user data requested to be read in accordance with the read command and the read unit. The fetch scheduling module 31 determines a predicted NAND use time corresponding to the read command, based on the estimated number Nr of read requests. Specifically, the fetch scheduling module 31 calculates the product of the estimated number Nr of read requests and a read time tR, as the predicted NAND use time corresponding to the read command. The read time tR is time required for a read operation in the NAND flash memory 4 in accordance with one read request. The read operation is an operation of reading data from the NAND flash memory 4 (more specifically, from the memory cell array 421).

In addition, for example, when having fetched a write command from the submission queues 25, the fetch scheduling module 31 calculates the number Nw of write requests to be issued to the NAND memory chip 41 in accordance with the write command. The size of user data requested to be written in accordance with the write command may be smaller than the write unit or may be larger than the write unit. The fetch scheduling module 31 estimates the number Nw of write requests to be issued to the NAND memory chip 41, based on the size of the user data requested to be written in accordance with the write command and the write unit. The fetch scheduling module 31 determines a predicted NAND use time corresponding to the write command, based on the estimated number Nw of write requests. Specifically, the fetch scheduling module 31 calculates the product of the estimated number Nw of write requests and a program time tProg, as the predicted NAND use time corresponding to the write command. The program time tProg is time required for a program operation in the NAND flash memory 4 in accordance with one write request. The program operation is an operation of writing (programming) data into the NAND flash memory 4. The program time tProg is, for example, longer than the read time tR.

FIG. 13 illustrates an example of relationships between commands and predicted NAND use times. More specifically, FIG. 13 illustrates examples of a NAND access size, the number of NAND requests, and a predicted NAND use time that correspond to a command.

The NAND access size is the size of data in the NAND flash memory 4 to be accessed in accordance with a corresponding command.

In a case where the command is a read command, the NAND access size is the size of user data read from the NAND flash memory 4 in accordance with the read command. Data read from the NAND flash memory 4 in one data read operation is data of the read unit. Therefore, the NAND access size in accordance with the read command is Nr times of the read unit. Nr corresponds to the number of read requests generated based on the read command. Nr is an integer of one or larger.

In a case where the command is a write command, the NAND access size is the size of user data written into the NAND flash memory 4 in accordance with the write command. Data written into the NAND flash memory 4 in one data write operation is data of the write unit. When the size of user data to be written in accordance with the write command is smaller than the write unit, the user data is written into the NAND flash memory 4 together with data to be written in accordance with one or more other write commands, as data of the write unit. Thus, when user data to be written in accordance with one or more write commands has reached the write unit, one write request to write the user data of the write unit into the NAND flash memory 4 is generated.

The number of NAND requests is the number of NAND requests generated based on the corresponding command.

In a case where the command is a read command, the number of NAND requests indicates the number Nr of read requests that are generated based on the read command. One read request requests the NAND flash memory 4 to read user data of the read unit.

In a case where the command is a write command, the number of NAND requests indicates the number Nw of write requests that are generated based on the write command. One write request requests the NAND flash memory 4 to write user data of the write unit. The number Nw of write requests corresponding to the write command is indicated by a ratio of the size of user data to be written in accordance with the write command to the write unit.

The predicted NAND use time is a duration for which the NAND flash memory 4 is predicted to be used in accordance with the corresponding command. In a case where the command is a read command, the product of the number of NAND requests corresponding to the read command (i.e., the number Nr of read requests) and the read time tR is calculated as the predicted NAND use time, for example. In a case where the command is a write command, the product of the number of NAND requests corresponding to the write command (i.e., the number Nw of write requests) and the program time tProg is calculated as the predicted NAND use time, for example.

The examples of the commands illustrated in FIG. 13 will be specifically described. Here, it is assumed that the read time tR is 50 microseconds ($\mu$s) and the program time tProg is 1 millisecond (ms). In addition, as in the example illustrated in FIG. 12, it is assumed that the read unit is 16 KB and the write unit is 192 KB.

In the case of a read command to read user data of 4 KB, the user data of 4 KB requested to be read is smaller than the read unit (16 KB). Accordingly, the NAND access size is 16 KB. Since the NAND flash memory 4 is requested to read data of the read unit, the number Nr of NAND requests is one. Therefore, the predicted NAND use time is 50 $\rho$s ($=$tR$\times$Nr$=$50 $\mu$s$\times$1).

In the case of a read command to read user data of 16 KB, the user data of 16 KB requested to be read is equivalent to the read unit (16 KB). Accordingly, the NAND access size is 16 KB. Since the NAND flash memory 4 is requested to read data of the read unit, the number Nr of NAND requests is one. Therefore, the predicted NAND use time is 50 $\mu$s (50 $\mu$s$\times$1).

In the case of a read command to read user data of 128 KB, the user data of 128 KB requested to be read is eight times the read unit (16 KB). Accordingly, the NAND access size is 16 KB$\times$8. Since the NAND flash memory 4 is requested to read data of eight times the read unit, the number Nr of NAND requests is eight. Therefore, the predicted NAND use time is 400 $\mu$s ($=$50 $\mu$s$\times$8).

In the case of a write command to write user data of 16 KB, the user data of 16 KB requested to be written is smaller than the write unit (192 KB). Accordingly, the NAND access size is 16 KB. This means that the user data of 16 KB, together with user data of 176 KB to be written in accordance with one or more other write commands, is written into the NAND flash memory 4 as user data of 192 KB (write unit). Thus, a write request corresponding to the write command is equivalent to $\frac{1}{12}$ ($=$16/192) of one write request that requests writing data of the write unit. That is, the number Nw of NAND requests is $\frac{1}{12}$. Therefore, the predicted NAND use time is 84 $\mu$s ($=$tProg$\times$Nw$=$1000 $\mu$s$\times\frac{1}{12}$).

In the case of a write command to write user data of 128 KB, the user data of 128 KB requested to be written is smaller than the write unit (192 KB). Accordingly, the NAND access size is 128 KB. This means that the user data of 128 KB, together with user data of 64 KB to be written in accordance with one or more other write commands, is written to the NAND flash memory 4 as user data of 192 KB (write unit). Thus, a write request corresponding to the write command is equivalent to $\frac{2}{3}$ ($=$128/192) of one write request that requests writing data of the write unit. That is, the number Nw of NAND requests is $\frac{2}{3}$. Therefore, the predicted NAND use time is 667 $\mu$s ($=$1000 $\mu$s$\times\frac{2}{3}$).

In the case of a write command to write user data of 192 KB, the user data of 192 KB requested to be written is equal to the write unit (192 KB). Accordingly, the NAND access size is 192 KB. A write request corresponding to the write command is one write request that requests writing data of the write unit. That is, the number Nw of NAND requests is one. Therefore, the predicted NAND use time is 1000 $\mu$s (1000 $\mu$s$\times$1).

As described above, the fetch scheduling module 31 can estimate the number of NAND requests to be issued to the NAND memory chip 41 in accordance with a fetched command and calculate a predicted NAND use time corresponding to the command. The fetch scheduling module 31 updates the NAND use time VT of a belonging group by using the predicted NAND use time, thereby managing the NAND use time VT per group.

The description returns to FIG. 11 and the management of a NAND use time NVT of a namespace will be specifically described.

In response to the update of the NAND use time VT of a belonging group, the fetch scheduling module 31 updates a NAND use time NVT of a namespace with which the belonging group is associated. Specifically, for example, the fetch scheduling module 31 identifies the namespace with which the belonging group is associated (hereinafter referred to as a first target namespace) and identifies all groups associated with the first target namespace by using the group management table 51. The fetch scheduling module 31 acquires NAND use times VT of all the identified groups by using the group-NAND use time management table 52. The fetch scheduling module 31 replaces the NAND use time NVT of the first target namespace in the NS-NAND use time management table 53 with the sum of the acquired NAND use times VT of all the identified groups. Thus, the fetch scheduling module 31 can manage the NAND use time NVT per namespace.

The fetch scheduling module 31 selects a fetch target submission queue 25 by using at least one of the NAND use time VT per group and the NAND use time NVT per namespace. Specifically, the fetch scheduling module 31 controls the priority P for fetching a command from each of the plurality of submission queues 25 by using at least one of the NAND use time VT per group and the NAND use time NVT per namespace. Then, the fetch scheduling module 31 selects a fetch target submission queue 25 from the plurality of submission queues 25, based on the priority P of each of the plurality of the submission queues 25.

For example, the fetch scheduling module 31 sets the same priority P to one or more submission queues 25 that are allocated to one namespace. The fetch scheduling module 31 may further set the same priority P to one or more submission queues 25 that belong to one group. For example, in response to update of the NAND use time NVT of any of the namespaces, the fetch scheduling module 31 updates the priority P set for each of the plurality of groups.

Two specific examples of methods of controlling the priority P will be described.

(Method for Using NAND Flash Memory 4 Evenly Between Namespaces)

For example, when the NAND use time NVT of a namespace is relatively long among the NAND use times NVT of the plurality of namespaces, the fetch scheduling module 31 decreases the priority P of at least any of groups associated with the namespace by a first value. Note that when the NAND use time NVT of a namespace is relatively short, the fetch scheduling module 31 may increase the priority P of at least any of groups associated with the namespace by a second value. The second value may be equal to or different from the first value.

Specifically, the fetch scheduling module 31 calculates the average of the NAND use times NVT of all the plurality of namespaces (hereinafter also referred to as an NS average use time). When a value obtained by subtracting the NS average use time from the NAND use time NVT of a namespace is larger than a threshold value A, the fetch scheduling module 31 determines that the namespace has a relatively long NAND use time NVT. In this case, the fetch scheduling module 31 may determine that each of the namespaces, other than the namespace having the relatively long NAND use time NVT, has a relatively short NAND use times NVT.

Alternatively, when a value obtained by subtracting the NAND use time NVT of a namespace from the NS average use time is larger than a threshold value B, the fetch scheduling module 31 determines that the namespace has a relatively short NAND use time NVT. The threshold value B may be equal to or different from the threshold value A. In this case, the fetch scheduling module 31 may determine that each of the namespaces, other than the namespace having the relatively short NAND use time NVT, has a relatively long NAND use time NVT.

For example, the fetch scheduling module 31 may disable the fetching of a command from at least any of the submission queues 25 that are allocated to a namespace having a relatively long NAND use time NVT. In addition, for example, the fetch scheduling module 31 may enable the fetching of a command from at least any of the submission queues 25 allocated to a namespace having a relatively short NAND use time NVT. Note that each of the submission queues 25 allocated to a namespace is a submission queue 25 that belongs to one of groups associated with the namespace.

As described above, the fetch scheduling module 31 can decrease a frequency at which a command is fetched from a submission queue 25 allocated to a namespace having a relatively long NAND use time NVT. In addition, the fetch scheduling module 31 can increase a frequency at which a command is fetched from a submission queue 25 allocated to a namespace having a relatively short NAND use time NVT. Thus, for any of the plurality of namespaces, the controller 6 can manage sufficient number of commands (more specifically, NAND requests based on commands) for using the NAND flash memory 4 evenly between the namespaces. Therefore, the controller 6 can improve an evenness of use of the NAND flash memory 4 between the plurality of namespaces. In addition, the controller 6 can prevent commands corresponding to a specific namespace from being fetched excessively and then prevent a waste of resources of the memory system 3.

(Method for Using NAND Flash Memory 4 Evenly Between Groups)

For example, when the NAND use time VT of a group is relatively long among the NAND use times VT of the plurality of groups which are associated with a namespace, the fetch scheduling module 31 decreases the priority P of the group by the first value. This namespace has, for example, a relatively long NAND use time NVT.

For example, when the NAND use time VT of a group is relatively short among the NAND use times VT of the plurality of groups which are associated with a namespace, the fetch scheduling module 31 may increase the priority P of the group by the second value. This namespace has, for example, a relatively long NAND use time NVT or a relatively short NAND use time NVT.

Specifically, the fetch scheduling module 31 calculates the average of the NAND use times VT of all of groups associated with a namespace (hereinafter also referred to as a group average use time). When a value obtained by subtracting the group average use time from the NAND use time VT of a group is larger than a threshold value C, the fetch scheduling module 31 determines that the group has a relatively long NAND use time VT. In this case, the fetch scheduling module 31 may determine that each of the groups, other than the group having the relatively long NAND use time VT, has a relatively short NAND use time VT.

Alternatively, when a value obtained by subtracting the NAND use time VT of a group from the group average use time is larger than a threshold value D, the fetch scheduling module 31 determines that the group has a relatively short NAND use time VT. The threshold value D may be equal to or different from the threshold value C. In this case, the fetch scheduling module 31 may determines that each of the groups, other than the group having the relatively short NAND use time VT, has a relatively long NAND use time VT.

For example, the fetch scheduling module 31 may identify a group having a relatively long NAND use time VT from the groups associated with a namespace and disable the fetching of a command from the submission queues 25 that belong to the identified group. For example, the fetch scheduling module 31 may identify a group having a relatively short NAND use time VT and enable the fetching of a command from the submission queues 25 that belong to the identified group.

As described above, the fetch scheduling module 31 can decrease a frequency at which a command is fetched from the submission queues 25 that belong to a group having a relatively long NAND use time VT. In addition, the fetch scheduling module 31 can increase a frequency at which a command is fetched from the submission queues 25 that belong to a group having a relatively short NAND use time VT. Thus, for any of the groups associated with a namespace, the controller 6 can manage sufficient number of commands for using the NAND flash memory 4 evenly between the groups. Therefore, the controller 6 can improve an evenness of use of the NAND flash memory 4 between the groups associated with the namespace. In addition, the controller 6 can prevent commands corresponding to a specific group from being fetched excessively and then prevent a waste of resources of the memory system 3.

The command processing module 32 generates one or more NAND requests on the basis of a command received from the fetch scheduling module 31 and stores the one or more NAND requests in the intermediate queue 15.

Specifically, for example, in a case where the received command is a read command, the command processing module 32 converts a logical address designated in the read command to a physical address by using the logical-to-physical address translation table 50. The command processing module 32 generates one or more NAND requests (read requests), based on the size of user data to be read in accordance with the read command and the read unit of the NAND flash memory 4.

For example, in a case where the received command is a write command, the command processing module 32 generates one NAND request (write request) when the size of user data to be written in accordance with one or more write commands has reached the write unit of the NAND flash memory 4. The size of user data to be written in accordance with the one or more write commands is the size of user data designated in the one or more write commands.

The command processing module 32 stores the generated one or more NAND requests in a corresponding intermediate queue 15. The corresponding intermediate queue 15 is an intermediate queue 15 that corresponds to a group to which a submission queue 25 from which the command has been fetched belongs. For example, a NAND request based on a command fetched from the submission queue 25-0 is stored in the intermediate queue 15-1 corresponding to the group G10 to which the submission queue 25-0 belongs. For example, a NAND request based on a command fetched from the submission queue 25-13 is stored in the intermediate queue 15-4 corresponding to the group G21 to which the submission queue 25-13 belongs.

In some cases, an actual NAND use time corresponding to a command may be different from the NAND use time corresponding to the command calculated by the fetch scheduling module 31. In this case, the command processing module 32 may feed information for correcting the NAND use time back to the fetch scheduling module 31. The information for correcting the NAND use time is also referred to as correction information. A specific example of the correction information will be described below.

While user data to be read in accordance with a read command is cached in the read buffer 55 (cache hit), the command processing module 32 does not have to read the user data from the NAND flash memory 4. In this case, the command processing module 32 does not generate NAND requests based on the read command. For example, the command processing module 32 sends correction information indicative of the number of the NAND requests that were not generated according to the cache hit (hereinafter referred to as first correction information) to the fetch scheduling module 31.

For example, the fetch scheduling module 31 subtracts a NAND use time based on the number of the NAND requests indicated in the first correction information (=the number of the NAND requests×the read request time tR) from the NAND use time VT of a corresponding group. Alternatively, the fetch scheduling module 31 may subtract a value obtained by dividing the NAND use time based on the number of the NAND requests indicated in the first correction information by the weight W of the corresponding group, from the NAND use time VT of the group.

In a case where a logical address designated in a read command is not associated with any physical address in the logical-to-physical address translation table 50 (in other words, the designated logical address corresponds to an unmapped area), the command processing module 32 does not generate NAND requests based on the read command. The command processing module 32 sends, for example, correction information indicative of the number of the NAND requests that were not generated according to the designated logical address corresponding to the unmapped area (hereinafter referred to as second correction information) to the fetch scheduling module 31.

For example, the fetch scheduling module 31 subtracts a NAND use time based on the number of the NAND requests indicated in the second correction information (=the number of the NAND requests×the read request time tR) from the NAND use time VT of a corresponding group. Alternatively, the fetch scheduling module 31 may subtract a value obtained by dividing the NAND use time based on the number of the NAND requests indicated in the second correction information by the weight W of the corresponding group, from the NAND use time VT of the group.

The fetch scheduling module 31 may further update the NAND use time NVT of a namespace with which the group is associated by using the NAND use time VT subtracted based on the first correction information or the second correction information.

In a case where a command received from the fetch scheduling module 31 is a flush command, the command processing module 32 generates a NAND request for writing user data corresponding to write commands, which have been received, into the NAND flash memory 4 with padding. Writing the user data with padding means writing data of the write unit that includes the user data stored in the write buffer 54 and data for padding. The command processing module 32 sends, for example, correction information indicative of the number of NAND requests corresponding to the data for padding (hereinafter referred to as third correction information) to the fetch scheduling module 31.

The fetch scheduling module 31 adds a NAND use time based on the number of NAND requests indicated in the third correction information (=the number of NAND requests×the program time tProg), to the NAND use time VT of a corresponding group. Alternatively, the fetch scheduling module 31 may add a value obtained by dividing the NAND use time based on the number of the NAND requests indicated in the third correction information by the weight W of the corresponding group, to the NAND use time VT of the group.

The fetch scheduling module 31 may further update the NAND use time NVT of a namespace with which the group is associated by using the NAND use time VT added based on the third correction information.

As described above, the fetch scheduling module 31 may correct the NAND use time VT of a group or the NAND use time NVT of a namespace by using correction information provided by the command processing module 32.

The NAND scheduling module 33 schedules processes in accordance with NAND requests stored in the plurality of intermediate queues 15. Specifically, the NAND scheduling module 33 acquires a NAND request of a processing target so that the NAND flash memory 4 is used evenly between the namespaces. Alternatively, the NAND scheduling module 33 may acquire a NAND request of a processing target from the intermediate queues 15 so that the NAND flash memory 4 is used evenly between the namespaces and the NAND flash memory 4 is used evenly between the groups. The NAND scheduling module 33 executes a process for the NAND flash memory 4, based on the acquired NAND request. Note that in a case where the NAND flash memory

4 includes the plurality of NAND memory chips 41, the NAND scheduling module 33 may perform the scheduling per NAND memory chip 41.

The NAND scheduling module 33 may feed information that indicates use status of the NAND flash memory 4 (hereinafter referred to as use status information) back to the fetch scheduling module 31. For example, the NAND scheduling module 33 periodically sends the use status information based on NAND requests acquired from each of the intermediate queues 15 in a specific time period, to the fetch scheduling module 31. The specific time period, is for example, 50 ms.

Alternatively, in response to acquiring L read requests from an intermediate queue 15, the NAND scheduling module 33 may send use status information indicating that the L read requests of a group corresponding to the intermediate queue 15 have been processed, to the fetch scheduling module 31. Alternatively, in response to acquiring M write requests from an intermediate queue 15, the NAND scheduling module 33 may send use status information that indicates that the M write requests of a group corresponding to the intermediate queue 15 have been processed, to the fetch scheduling module 31. L is, for example, larger than M. M is, for example, one. That is because the program time tProg in accordance a write request is long and thus, overhead of a process for feedback of the use status information indicating that the M write requests have been processed tends not to affect processes of NAND requests by the NAND scheduling module 33.

The fetch scheduling module 31 may correct the NAND use time VT of a group and the NAND use time NVT of a namespace, by using the use status information received from the NAND scheduling module 33. For example, the fetch scheduling module 31 may subtract a NAND use time calculated based on the use status information, from the NAND use time VT of the group.

Processes executed in the memory system 3 will be described with reference to FIG. 14 and FIG. 15.

Figure 14:
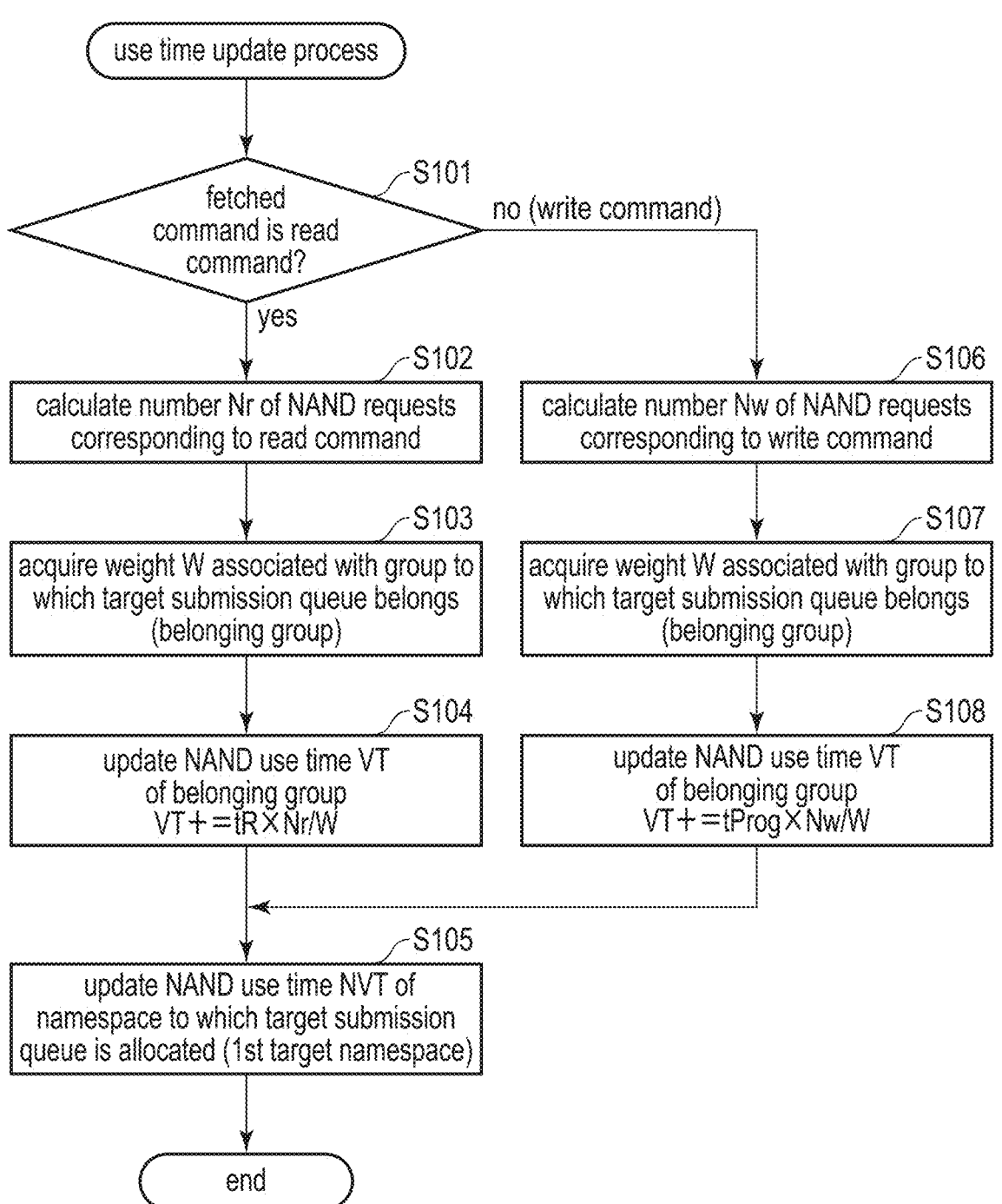
FIG. 14 is a flowchart illustrating an example of the procedure of a NAND use time update process executed in the memory system according to the embodiment.

FIG. 14 is a flowchart illustrating an example of the procedure of a use time update process executed by the fetch scheduling module 31. The use time update process is a process of updating, based on a command fetched from a submission queue 25, the NAND use times of a namespace and a group that correspond to the submission queue 25. The fetch scheduling module 31 executes the use time update process, for example, when a command has been fetched from a submission queue 25 among the plurality of submission queues 25. Here, a case where the command fetched from the submission queues 25 is either a write command or a read command will be explained. The submission queue 25 from which the command has been fetched is referred to as a target submission queue 25.

First, the fetch scheduling module 31 determines whether the fetched command is a read command or not (step S101).

When the fetched command is a read command (yes in step S101), the fetch scheduling module 31 calculates the number Nr of NAND requests (i.e., the number Nr of read requests) corresponding to the read command (step S102). The fetch scheduling module 31 acquires the weight W associated with a group to which the target submission queue 25 belongs (belonging group), from the group management table 51 (step S103).

The fetch scheduling module 31 adds the read time×the number of read requests/the weight (that is, tR×Nr/W) to the current NAND use time VT of the belonging group in the group-NAND use time management table 52, thereby updating the NAND use time VT of the belonging group (step S104), and proceeds to step S105. Specifically, for example, the fetch scheduling module 31 acquires the current NAND use time VT of the belonging group from the group-NAND use time management table 52. The fetch scheduling module 31 calculates a value obtained by adding the read time×the number of read requests/the weight to the acquired current NAND use time VT. Then, the fetch scheduling module 31 sets the calculated value as the NAND use time VT of the belonging group in the group-NAND use time management table 52.

When the fetched command is a write command, (no in step S101), the fetch scheduling module 31 calculates the number Nw of NAND requests (i.e., the number Nw of write requests) corresponding to the write command (step S106). The fetch scheduling module 31 acquires the weight W associated with the group to which the target submission queue 25 belongs (belonging group) from the group management table 51 (step S107).

The fetch scheduling module 31 adds the program time× the number of write requests/the weight (that is, tProg×Nw/W) to the current NAND use time VT of the belonging group in the group-NAND use time management table 52, thereby updating the NAND use time VT of the belonging group (step S108), and proceeds to step S105. Specifically, for example, the fetch scheduling module 31 acquires the current NAND use time VT of the belonging group from the group-NAND use time management table 52. The fetch scheduling module 31 calculates a value obtained by adding the program time×the number of write requests/the weight to the acquired current NAND use time VT. The fetch scheduling module 31 sets the calculated value as the NAND use time VT of the belonging group in the group-NAND use time management table 52.

Next, in step S105, the fetch scheduling module 31 updates the NAND use time NVT of a namespace to which the target submission queue 25 is allocated (first target namespace) and ends the use time update process. Specifically, for example, the fetch scheduling module 31 identifies all groups that are associated with the first target namespace by using the group management table 51. The fetch scheduling module 31 acquires the NAND use times VT of all the identified groups from the group-NAND use time management table 52. The fetch scheduling module 31 calculates the sum of the acquired NAND use times VT. Then, the fetch scheduling module 31 sets the calculated sum of the NAND use times VT as the NAND use time NVT of the first target namespace in the NS-NAND use time management table 53.

With the use time update process described above, the fetch scheduling module 31 can update the NAND use time VT of a group to which the target submission queue 25 belongs and the NAND use time NVT of a namespace to which the target submission queue 25 is allocated, based on a command fetched from the target submission queue 25.

FIG. 15 is a flowchart illustrating an example of the procedure of a priority control process executed by the fetch scheduling module 31. The priority control process is a process of controlling the priority P for the fetching commands from each submission queue 25, based on the NAND use time NVT per namespace and the NAND use time VT per group. The fetch scheduling module 31 executes the priority control process, for example, when having completed the use time update process described above with reference to FIG. 14.

First, the fetch scheduling module 31 calculates the average of the NAND use times NVT of all the plurality of namespaces (NS average use time) by using the NS-NAND use time management table 53 (step 201).

Next, the fetch scheduling module 31 selects one namespace from the plurality of namespaces (step S202). The selected namespace is referred to as a second target namespace. The fetch scheduling module 31 determines whether a difference obtained by subtracting the NS average use time from the NAND use time NVT of the second target namespace is larger than the threshold value A or not (step S203).

When the difference obtained by subtracting the NS average use time from the NAND use time NVT of the second target namespace is equal to or smaller than the threshold value A (no in step S203), the fetch scheduling module 31 increases the priority P (or priorities P) of the one or more submission queues 25 that are allocated to the second target namespace (step S204) and proceeds to step S211. Specifically, for example, the fetch scheduling module 31 increases, in the group management table 51, the priority P corresponding to each of the one or more groups that are associated with the second target namespace by the second value. Each of the groups associated with the second target namespace is a group to which at least one of the submission queues 25 allocated to the second target namespace belongs. Alternatively, for example, the fetch scheduling module 31 may enable fetching from the submission queues 25 allocated to the second target namespace.

When the difference obtained by subtracting the NS average use time from the NAND use time NVT of the second target namespace is larger than the threshold value A (yes in step S203), in step S205, the fetch scheduling module 31 calculates the average of NAND use times VT of all the groups associated with the second target namespace (group average use time).

Next, the fetch scheduling module 31 selects one group from the one or more groups associated with the second target namespace (step S206). The selected group is referred to as a target group. The fetch scheduling module 31 determines whether a difference obtained by subtracting the group average use time from the NAND use time VT of the target group is larger than the threshold value C or not (step S207).

When the difference obtained by subtracting the group average use time from the NAND use time VT of the target group is larger than the threshold value C (yes in step S207), the fetch scheduling module 31 decreases the priority P (or priorities P) of the one or more submission queues 25 that belong to the target group (step S208). Specifically, for example, the fetch scheduling module 31 decreases, in the group management table 51, the priority P corresponding to the target group by the first value. Alternatively, the fetch scheduling module 31 may disable fetching from the submission queues 25 that belong to the target group.

When the difference obtained by subtracting the group average use time from the NAND use time VT of the target group is equal to or smaller than the threshold value C (no in step S207), the fetch scheduling module 31 increases the priority P (or priorities P) of the one or more submission queues 25 that belong to the target group (step S209). Specifically, for example, the fetch scheduling module 31 increases, in the group management table 51, the priority P corresponding to the target group by the second value. Alternatively, the fetch scheduling module 31 may enable fetching from the submission queues 25 that belong to the target group.

Next, the fetch scheduling module 31 determines whether or not there is another group that is associated with the second target namespace and has not been selected (step S210). When there is another group that has not been selected (yes in step S210), the process by the fetch scheduling module 31 returns to step S206. In other words, the fetch scheduling module 31 further performs a process for controlling the priority P with respect to said another group associated with the second target namespace.

When all the groups associated with the second target namespace have been selected (no in step S210), the process by the fetch scheduling module 31 proceeds to step S211.

Next, the fetch scheduling module 31 determines whether or not there is another namespace that has not been selected (step S211).

When there is another namespace that has not been selected (yes in step S211), the process by the fetch scheduling module 31 returns to step S202. That is, the fetch scheduling module 31 further performs a process for controlling the priority P per group with respect to submission queues 25 allocated to said another namespace.

When all the namespaces have been selected, (no in step S211), the fetch scheduling module 31 ends the priority control process.

With the priority control process described above, the fetch scheduling module 31 can control the priority P for the fetching of commands from each submission queue 25, based on the NAND use time NVT per namespace and the NAND use time VT per group. Specifically, when a condition that: the NAND use time NVT of a namespace to which a submission queue 25 is allocated is longer than the NS average use time by the threshold value A or more; and the NAND use time VT of a group to which the submission queue 25 belongs is longer than the group average use time by the threshold value C or more is satisfied, the fetch scheduling module 31 decreases the priority P (or priorities P) of the one or more submission queues 25 that belong to the group or disables fetching from the submission queues 25 that belong to the group. In contrast, the fetch scheduling module 31 increases the priority P (or priorities P) of the one or more submission queues 25 that belong to a group that does not satisfy the condition or enables fetching from the submission queues 25 that belong to the group.

Thus, the fetch scheduling module 31 can even out the use times of the NAND flash memory 4 between the namespaces. In addition, the fetch scheduling module 31 can even out the use times of the NAND flash memory 4 between the groups associated with one namespace.

Note that the fetch scheduling module 31 may be configured to strike a use balance of the NAND flash memory 4 per namespace between read operations and program operations. In this case, the fetch scheduling module 31 manages an index per namespace that indicates a relationship between a use amount of the NAND flash memory 4 in the read operations and a use amount of the NAND flash memory 4 in the program operations. This index is hereinafter referred to as a read-write use amount. For example, the fetch scheduling module 31 calculates as the read-write use amount: a value obtained by (1) subtraction of a processing amount in the NAND flash memory 4 executed in accordance with a read command fetched from the submission queues 25 allocated to a namespace and (2) addition of a processing amount in the NAND flash memory 4 executed in accordance with a write command fetched from the submission queues 25 allocated to the namespace. The fetch scheduling module 31 manages the read-write use amount, for example, by using the NS-NAND use time management table 53.

FIG. 16 illustrates another example of the configuration of the NS-NAND use time management table 53. Each entry in the NS-NAND use time management table 53 illustrated in FIG. 16 further includes a read-write use time field in addition to the NS field and the NAND use time field described above with reference to FIG. 5.

The read-write use time field indicates a read-write use amount with respect to a corresponding namespace. Every time a command is fetched from the submission queues 25 allocated to the namespace, the value indicated in the read-write use time field is updated by using a predicted use amount of the NAND flash memory 4 in accordance with the command (or a value obtained by dividing the predicted use amount by the weight W).

More specifically, the read-write use amount is represented by an index indicative of a relationship between a use time of the NAND flash memory 4 in read operations and a use time of the NAND flash memory 4 in program operations (hereinafter referred to as a read-write use time RWVT) with respect to the corresponding namespace. The read-write use time RWVT is, for example, represented by a value that is obtained by (1) subtraction of a use time of the NAND flash memory 4 in accordance with a read command fetched from the submission queues 25 allocated to the corresponding namespace and (2) addition of a use time of the NAND flash memory 4 in accordance with a write command fetched from the submission queues 25 allocated to the namespace, from a certain time point. Specifically, when a read command has been fetched from the submission queues 25 allocated to the namespace, a predicted use time of the NAND flash memory 4 in accordance with the read command (or a value obtained by dividing the predicted use time by the weight W) is subtracted from the read-write use time RWVT corresponding to the namespace. When a write command has been fetched from the submission queues 25 allocated to the namespace, a predicted use time of the NAND flash memory 4 in accordance with the write command (or a value obtained by dividing the predicted use time by the weight W) is added to the read-write use time RWVT corresponding to the namespace.

In the example illustrated in FIG. 16, the NAND use time of the namespace "1" is, for example, NVT1. The read-write use time of the namespace "1" is RWVT1. The NAND use time of the namespace "2" is NVT2. The read-write use time of the namespace "2" is RWVT2.

Note that when using the NS-NAND use time management table 53 illustrated in FIG. 16, the fetch scheduling module 31 may not use the group-NAND use time management table 52. In this case, every time a command is fetched from the submission queues 25 allocated to a namespace, the fetch scheduling module 31 updates the NAND use time NVT corresponding to the namespace by using a predicted NAND use time in accordance with the command (or a value obtained by dividing the predicted NAND use time by the weight W). In other words, when the group-NAND use time management table 52 is not used, the fetch scheduling module 31 updates the NAND use time NVT of the corresponding namespace by using the predicted NAND use time in accordance with the fetched command, instead of calculating the sum of the NAND use times VT of all the groups associated with the namespace, as the NAND use time NVT of the namespace.

Processes to strike a use balance of the NAND flash memory 4 between read operations and program operations with respect to a namespace will be explained with reference to FIG. 17 and FIG. 18.

FIG. 17 is a flowchart illustrating another example of the procedure of the use time update process executed by the fetch scheduling module 31. The use time update process is a process of updating, based on a command fetched from a submission queue 25, the NAND use time NVT and the read-write use time RWVT of a namespace corresponding to the submission queue 25. For example, the fetch scheduling module 31 executes the use time update process when a command has been fetched from any of the submission queues 25. Here, a case where the command fetched from the submission queues 25 is either a write command or a read command will be explained.

First, the fetch scheduling module 31 determines whether the fetched command is a read command or not (step S301).

When the fetched command is a read command (yes in step S301), the fetch scheduling module 31 calculates the number Nr of NAND requests (the number Nr of read requests) corresponding to the read command (step S302). The fetch scheduling module 31 acquires the weight W associated with a group to which the target submission queue 25 belongs, from the group management table 51 (step S303).

The fetch scheduling module 31 subtracts the read time× the number of read requests/the weight (that is, tR×Nr/W) from the current read-write use time RWVT of a namespace to which the target submission queue 25 is allocated (first target namespace), thereby updating the read-write use time RWVT of the first target namespace in the NS-NAND use time management table 53 (step S304). Specifically, for example, the fetch scheduling module 31 acquires the current read-write use time RWVT of the first target namespace from the NS-NAND use time management table 53. The fetch scheduling module 31 calculates a value by subtracting the read time×the number of read requests/the weight from the acquired current read-write use time RWVT. Then, the fetch scheduling module 31 sets the calculated value as the read-write use time RWVT of the first target namespace in the NS-NAND use time management table 53.

Next, the fetch scheduling module 31 adds the value obtained by the read time×the number of read requests/the weight (that is, tR×Nr/W) to the current NAND use time NVT of the first target namespace, thereby updating the NAND use time NVT of the first target namespace in the NS-NAND use time management table 53 (step S305), and ends the use time update process. Specifically, for example, the fetch scheduling module 31 acquires the current NAND use time NVT of the first target namespace from the NS-NAND use time management table 53. The fetch scheduling module 31 calculates the value obtained by adding the read time×the number of read requests/the weight to the acquired current NAND use time NVT. Then, the fetch scheduling module 31 sets the calculated value as the NAND use time NVT of the first target namespace in the NS-NAND use time management table 53.

When the fetched command is a write command, (no in step 301), the fetch scheduling module 31 calculates the number Nw of NAND requests (the number Nw of write request) corresponding to the write command (step S306). The fetch scheduling module 31 acquires the weight W associated with a group to which the target submission queue 25 belongs, from the group management table 51 (step S307).

The fetch scheduling module 31 adds a value obtained by the program time×the number of write requests/the weight (that is, tProg×Nw/W) to the current read-write use time RWVT of the first target namespace, thereby updating the read-write use time RWVT of the first target namespace in the NS-NAND use time management table 53 (step S308). Specifically, for example, the fetch scheduling module 31 acquires the current read-write use time RWVT of the first target namespace from the NS-NAND use time management table 53. The fetch scheduling module 31 calculates the value obtained by adding the program time×the number of write requests/the weight to the acquired current read-write use time RWVT. Then, the fetch scheduling module 31 sets the calculated value as the read-write use time RWVT of the first target namespace in the NS-NAND use time management table 53.

Next, the fetch scheduling module 31 adds the value obtained by the program time×the number of write requests/ the weight (that is, tProg×Nw/W) to the current NAND use time NVT of the first target namespace, thereby updating the NAND use time NVT of the first target namespace in the NS-NAND use time management table 53 (step S309), and ends the use time update process. Specifically, for example, the fetch scheduling module 31 acquires the current NAND use time NVT of the first target namespace from the NS-NAND use time management table 53. The fetch scheduling module 31 calculates the value by adding the program time×the number of write requests/the weight to the acquired current NAND use time NVT. Then, the fetch scheduling module 31 sets the calculated value as the NAND use time NVT of the first target namespace in the NS-NAND use time management table 53.

With the use time update process described above, the fetch scheduling module 31 can update the NAND use time NVT and the read-write use time RWVT of a namespace to which the target submission queue 25 is allocated, based on a command fetched from the target submission queue 25.

In the use time update process described above, the fetch scheduling module 31 updates the read-write use time RWVT by the subtraction of the read time×the number of read requests/the weight (step S304) or the addition of the program time×the number of write requests/the weight (step S308). However, the fetch scheduling module 31 may update the read-write use time RWVT by a first operation (for example, addition, multiplication, or division) of the read time×the number of read requests/the weight, or by a second operation (for example, subtraction, division, or multiplication) of the program time×the number of write requests/the weight. The second operation is, for example, an inverse operation of the first operation.

FIG. 18 is a flowchart illustrating another example of the procedure of the priority control process executed by the fetch scheduling module 31. The priority control process is a process of controlling the priority P for the fetching of commands from each submission queue 25, based on the NAND use time NVT and the read-write use time RWVT per namespace. The fetch scheduling module 31 executes the priority control process, for example, when having completed the use time update process described above with reference to FIG. 17.

The processes from step S401 to step S404 are the same as the processes from step S201 to step S204 of the priority control process described above with reference to FIG. 15. That is, the fetch scheduling module 31 determines whether the NAND use time NVT of a selected namespace (second target namespace) is relatively long or not. Then, when the NAND use time NVT of the second target namespace is relatively short, the fetch scheduling module 31 increases the priority P (or priorities P) of the one or more submission queues 25 that are allocated to the second target namespace.

When the NAND use time NVT of the second target namespace is relatively long, in other words, a value obtained by subtracting the NS average use time from the NAND use time NVT of the second target namespace is larger than the threshold value A (yes in step S403), the fetch scheduling module 31 decreases the priority P (or priorities P) of the submission queues 25 allocated to the second target namespace (step S405). Alternatively, the fetch scheduling module 31 may disable the fetching of a command from the submission queues 25 allocated to the second target namespace. Then, the fetch scheduling module 31 determines whether the read-write use time RWVT of the second target namespace is larger than a threshold value E or not (step S406). The threshold value E is zero or larger, and is, for example, zero. The read-write use time RWVT of the second target namespace larger than the threshold value E means that the NAND use time in program operations is longer than the NAND use time in read operations with respect to the second target namespace.

When the read-write use time RWVT of the second target namespace is larger than the threshold value E (yes in step S406), the fetch scheduling module 31 increases the priority P of the submission queues 25 for read allocated to the second target namespace (step S407). Then, the fetch scheduling module 31 decreases the priority P of the submission queues 25 for write allocated to the second target namespace (step S408) and proceeds to step S412.

When the read-write use time RWVT of the second target namespace is equal to or smaller than the threshold value E (no in step S406), the fetch scheduling module 31 determines whether the read-write use time RWVT of the second target namespace is smaller than a threshold value F or not (step S409). The threshold value F is zero or smaller, and is, for example, zero. The threshold value F is equal to or smaller than the threshold value E. For example, in a use case where shortening latency related to read commands is emphasized, the threshold value F is set to a smaller value. The read-write use time RWVT of the second target namespace smaller than the threshold value F means that the NAND use time in read operations is longer than the NAND use time in program operations with respect to the second target namespace.

When the read-write use time RWVT of the second target namespace is smaller than the threshold value F (yes in step S409), the fetch scheduling module 31 increases the priority P of the submission queues 25 for write allocated to the second target namespace (step S410). Then, the fetch scheduling module 31 decreases the priority P of the submission queues 25 for read allocated to the second target namespace (step S411) and proceeds to step S412.

When the read-write use time RWVT of the second target namespace is equal to or larger than the threshold value F (no in step S409), the process by the fetch scheduling module 31 proceeds to step S412.

Next, the fetch scheduling module 31 determines whether there is another namespace that has not been selected (step S412).

When there is another namespace that has not been selected (yes in step S412), the process by the fetch scheduling module 31 returns to step S402. That is, the fetch scheduling module 31 further executes a process to control the priority P of each submission queue 25 allocated to said another namespace.

When all the namespaces have been selected, (no in step S412), the fetch scheduling module 31 ends the priority control process.

Note that, in the priority control process, the determination on which of the program operations and the read operations have longer NAND use time (step S406 and step S409) may be changed depending on types of the first operation and the second operation used for updating the read-write use time RWVT.

With the priority control process described above, the fetch scheduling module 31 can even out the use times of the NAND flash memory 4 between the namespaces and can strike a use balance of the NAND flash memory 4 between the read operations and the program operations with respect to the second target namespace having a relatively long NAND use time NVT. Specifically, when the NAND use time in the program operations is longer than the NAND use time in the read operations with respect to the second target namespace, the fetch scheduling module 31 increases the priority P of the submission queues 25 for read allocated to the second target namespace and decreases the priority P of the submission queues 25 for write allocated to the second target namespace. When the NAND use time of the read operations is longer than the NAND use time of the program operations with respect to the second target namespace, the fetch scheduling module 31 increases the priority P of the submission queues 25 for write allocated to the second target namespace and decreases the priority P of the submission queues 25 for read allocated to the second target namespace.

As described above, according to the memory system 3 of the present embodiment, an evenness of use of a nonvolatile memory corresponding to a plurality of logical address spaces can be improved. The fetch scheduling module 31 communicates with the host 2 that includes a plurality of submission queues 25 each being capable of storing one or more commands. The fetch scheduling module 31 provides the host 2 with a plurality of namespaces. The plurality of namespaces include at least a first namespace. One or more of the plurality of submission queues 25 are allocated to each of the plurality of namespaces. The fetch scheduling module 31 calculates a plurality of first use amounts of the NAND flash memory 4 that correspond to the plurality of namespaces, respectively. The plurality of first use amounts include at least a second use amount that corresponds to the first namespace. The fetch scheduling module 31 selects a first submission queue 25 from which a command is to be fetched among the plurality of submission queues 25, based on the plurality of first use amounts. The first submission queue 25 is allocated to the first namespace. The fetch scheduling module 31 fetches a first command from the first submission queue 25. The fetch scheduling module 31 calculates a predicted use amount of the NAND flash memory 4. The predicted use amount is an amount of the NAND flash memory 4 that is to be used in accordance with the first command. The fetch scheduling module 31 updates the second use amount by using the calculated predicted use amount.

For example, the fetch scheduling module 31 selects a submission queue 25 that is allocated to a namespace having a small use amount of the NAND flash memory 4 as a fetch target submission queue 25 (or increases frequency at which the submission queue 25 is selected as the target submission queue 25), thereby storing sufficient number of NAND requests corresponding to the namespace in the intermediate queue 15. Thus, the NAND scheduling module 33 can schedule issuance of the NAND requests stored in the intermediate queues 15 so that the NAND flash memory 4 is used evenly between the namespaces. Therefore, the memory system 3 can improve the evenness of the use of the NAND flash memory 4 between the namespaces.

For example, the fetch scheduling module 31 does not select a submission queue 25 that is allocated to a namespace having a large use amount of the NAND flash memory 4 as the fetch target submission queue 25 (or decreases frequency at which the submission queue 25 is selected as the target submission queue 25), thereby preventing excessively storing NAND requests corresponding to the namespace in the intermediate queue 15 and preventing a waste of resources of the memory system 3 for managing fetched commands. Therefore, it is possible to reduce the resources of the memory system 3 for managing commands (for example, the size of storage area allocated as the intermediate queues 15), compared to the memory system 3C of the comparative example.

Each of the various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
   a nonvolatile memory; and
   a controller circuit electrically connected to the nonvolatile memory and configured to:
   communicate with a host that includes a plurality of queues each being capable of storing one or more commands;
   provide the host with a plurality of logical address spaces, the plurality of logical address spaces including at least a first logical address space, one or more queues of the plurality of queues being allocated to each of the plurality of logical address spaces;
   calculate a plurality of first use amounts of the nonvolatile memory that correspond to the plurality of logical address spaces, respectively, the plurality of first use amounts including at least a second use amount that corresponds to the first logical address space;
   control a priority for fetching a command from each of the plurality of queues, based on the plurality of first use amounts;
   select a first queue from which a command is to be fetched among the plurality of queues, based on the plurality of first use amounts and further based on the priority of each of the plurality of queues, the first queue being allocated to the first logical address space;
   fetch a first command from the first queue;
   calculate a predicted use amount of the nonvolatile memory, the predicted use amount being an amount of the nonvolatile memory that is to be used in accordance with the first command; and
   update the second use amount by using the predicted use amount, wherein the controller circuit is further configured to:
   calculate a first average use amount that indicates an average of the plurality of first use amounts; and
   when the second use amount is larger than the first average use amount by a first difference that is larger than a first threshold value, decrease the priority for fetching a command from at least any one of the one or more queues that are allocated to the first logical address space.

2. The memory system according to claim 1, wherein each of the plurality of queues is used either for storing read commands or for storing write commands, and the controller circuit is further configured to:
   manage a read-write use amount that indicates a relationship between a use amount of the nonvolatile memory in accordance with read commands and a use amount of the nonvolatile memory in accordance with write commands, the relationship corresponding to the first logical address space;
   when the first command is a read command, calculate the number of read requests to be issued to the nonvolatile memory in accordance with the first command, calculate the predicted use amount based on the calculated number of read requests and time required for read operations to be executed in the nonvolatile memory in accordance with the read requests respectively, and subtract the predicted use amount from the read-write use amount;
   when the first command is a write command, calculate the number of write requests to be issued to the nonvolatile memory in accordance with the first command, calculate the predicted use amount based on the calculated number of write requests and time required for program operations to be executed in the nonvolatile memory in accordance with the write requests respectively, and add the predicted use amount to the read-write use amount;
   when the read-write use amount is larger than a second threshold value, increase a first priority for fetching a command from a queue used for storing read commands among the one or more queues allocated to the first logical address space and decrease a second priority for fetching a command from a queue used for storing write commands among the one or more queues allocated to the first logical address space; and
   when the read-write use amount is smaller than a third threshold value, decrease the first priority and increase the second priority, the third threshold value being equal to or smaller than the second threshold value.

3. The memory system according to claim 1, wherein each of the plurality of queues is used either for storing read commands or for storing write commands, and the controller circuit is further configured to:
   manage a read-write use amount that indicates a relationship between a use amount of the nonvolatile memory in accordance with read commands and a use amount of the nonvolatile memory in accordance with write commands, the relationship corresponding to the first logical address space;
   when the first command is a read command, calculate the number of read requests to be issued to the nonvolatile memory in accordance with the first command and calculate the predicted use amount based on the calculated number of read requests and time required for read operations to be executed in the nonvolatile memory in accordance with the read requests respectively;
   when the first command is a write command, calculate the number of write requests to be issued to the nonvolatile memory in accordance with the first command and calculate the predicted use amount based on the calculated number of write requests and time required for program operations to be executed in the nonvolatile memory in accordance with the write requests respectively;
   update the read-write use amount by using the calculated predicted use amount; and
   control, based on the updated read-write use amount, the priority for fetching a command from a queue used for storing read commands among the one or more queues allocated to the first logical address space and the priority for fetching a command from a queue used for storing write commands among the one or more queues allocated to the first logical address space.

4. The memory system according to claim 1, wherein the controller circuit is further configured to:
   when the second use amount is larger than the first average use amount by the first difference that is larger than the first threshold value, disable fetching a command from at least any one of the one or more queues that are allocated to the first logical address space.

5. A memory system comprising:
a nonvolatile memory; and
a controller circuit electrically connected to the nonvolatile memory and configured to:
   communicate with a host that includes a plurality of queues each being capable of storing one or more commands;
   provide the host with a plurality of logical address spaces, the plurality of logical address spaces including at least a first logical address space, one or more queues of the plurality of queues being allocated to each of the plurality of logical address spaces;
   calculate a plurality of first use amounts of the nonvolatile memory that correspond to the plurality of logical address spaces, respectively, the plurality of first use amounts including at least a second use amount that corresponds to the first logical address space;
   select a first queue from which a command is to be fetched among the plurality of queues, based on the plurality of first use amounts, the first queue being allocated to the first logical address space;
   fetch a first command from the first queue;
   calculate the number of requests to be issued to the nonvolatile memory in accordance with the first command;
   calculate a predicted use amount of the nonvolatile memory based on the calculated number of requests, the predicted use amount being an amount of the nonvolatile memory that is to be used in accordance with the first command; and
   update the second use amount by using the predicted use amount, wherein
the controller circuit is further configured to, when the first command is a write command:
   calculate the number of write requests to be issued to the nonvolatile memory in accordance with the first command; and calculate the predicted use amount, based on the calculated number of write requests and time required for program operations to be executed in the nonvolatile memory in accordance with the write requests respectively.

6. The memory system according to claim 5, wherein the controller circuit is further configured to:
control a priority for fetching a command from each of the plurality of queues, based on the plurality of first use amounts; and
select a queue from which a command is to be fetched among the plurality of queues, further based on the priority of each of the plurality of queues.

7. The memory system according to claim 6, wherein the controller circuit is further configured to:
calculate a first average use amount that indicates an average of the plurality of first use amounts; and
when the second use amount is larger than the first average use amount by a first difference that is larger than a first threshold value, decrease the priority for fetching a command from at least any one of the one or more queues that are allocated to the first logical address space.

8. The memory system according to claim 5, wherein the controller circuit is further configured to, when the first command is a read command:
calculate the number of read requests to be issued to the nonvolatile memory in accordance with the first command; and
calculate the predicted use amount, further based on the calculated number of read requests and time required for read operations in the nonvolatile memory to be executed in accordance with the read requests respectively.

9. The memory system according to claim 5, wherein the controller circuit is further configured to:
manage one or more groups, at least one of the one or more queues allocated to the first logical address space belonging to each of the one or more groups, the one or more groups including at least a first group to which the first queue belongs;
manage one or more third use amounts corresponding to the one or more groups, respectively, the one or more third use amounts including at least a fourth use amount that corresponds to the first group;
fetch the first command from the first queue that belongs to the first group;
calculate the predicted use amount of the nonvolatile memory in accordance with the first command;
update the fourth use amount by using the predicted use amount; and
update the second use amount by using the fourth use amount.

10. A memory system comprising:
a nonvolatile memory; and
a controller circuit electrically connected to the nonvolatile memory and configured to:
communicate with a host that includes a plurality of queues each being capable of storing one or more commands;
provide the host with a plurality of logical address spaces, the plurality of logical address spaces including at least a first logical address space, one or more queues of the plurality of queues being allocated to each of the plurality of logical address spaces;
calculate a plurality of first use amounts of the nonvolatile memory that correspond to the plurality of logical address spaces, respectively, the plurality of first use amounts including at least a second use amount that corresponds to the first logical address space;
manage one or more groups, at least one of the one or more queues allocated to the first logical address space belonging to each of the one or more groups, the one or more groups including at least a first group;
manage one or more third use amounts corresponding to the one or more groups, respectively, the one or more third use amounts including at least a fourth use amount that corresponds to the first group;
select a first queue from which a command is to be fetched among the plurality of queues, based on the plurality of first use amounts, the first queue being allocated to the first logical address space and belonging to the first group;
fetch a first command from the first queue;
calculate a predicted use amount of the nonvolatile memory, the predicted use amount being an amount of the nonvolatile memory that is to be used in accordance with the first command;
update the second use amount by using the predicted use amount;
update the fourth use amount by using the predicted use amount; and
update the second use amount by further using the fourth use amount.

11. The memory system according to claim 10, wherein the controller circuit is further configured to:
control a priority for fetching a command from each of the plurality of queues, based on the one or more third use amounts; and
select a queue from which a command is to be fetched among the plurality of queues, further based on the priority of each of the plurality of queues.

12. The memory system according to claim 11, wherein the controller circuit is further configured to:
calculate a first average use amount that indicates an average of the plurality of first use amounts;
when the second use amount is larger than the first average use amount by a first difference that is larger than a first threshold value, calculate a second average use amount that indicates an average of the one or more third use amounts; and
when the fourth use amount is larger than the second average use amount by a second difference that is larger than a fourth threshold value, decrease the priority for fetching a command from the at least one queue that belongs to the first group.

13. The memory system according to claim 10, wherein the controller circuit is further configured to:
calculate a first average use amount that indicates an average of the plurality of first use amounts;
when the second use amount is larger than the first average use amount by a first difference that is larger than a first threshold value, calculate a second average use amount that indicates an average of the one or more third use amounts; and
when the fourth use amount is larger than the second average use amount by a second difference that is larger than a fourth threshold value, disable fetching a command from the at least one queue that belongs to the first group.

14. The memory system according to claim 10, wherein the controller circuit is further configured to:

manage one or more weights that correspond to the one or more groups, respectively;

calculate the number of requests to be issued to the nonvolatile memory in accordance with the first command; and calculate the predicted use amount, further based on the calculated number of requests and a first weight corresponding to the first group.

15. The memory system according to claim 14, wherein the controller circuit is configured to, when the first command is a read command:

calculate the number of read requests to be issued to the nonvolatile memory in accordance with the first command; and calculate the predicted use amount, based on the calculated number of read requests, the first weight, and time required for read operations to be executed in the nonvolatile memory in accordance with the read requests respectively.

16. The memory system according to claim 14, wherein the controller circuit is configured to, when the first command is a write command:

calculate the number of write requests to be issued to the nonvolatile memory in accordance with the first command; and calculate the predicted use amount, based on the calculated number of write requests, the first weight, and time required for program operations to be executed in the nonvolatile memory in accordance with the write requests respectively.

17. The memory system according to claim 10, wherein the controller circuit is configured to add the predicted use amount to the fourth use amount to update the fourth use amount.

18. The memory system according to claim 10, further comprising:

a volatile memory including one or more storage areas that correspond to the one or more groups, respectively, wherein the controller circuit is further configured to:

generate one or more requests to be issued to the nonvolatile memory in accordance with the first command; and store the one or more requests in a first storage area of the one or more storage areas that corresponds to the first group.

19. The memory system according to claim 18, wherein the controller circuit is further configured to:

acquire a request from the one or more storage areas; and issue the acquired request to nonvolatile memory.

* * * * *